(12) United States Patent
Nagatomo

(10) Patent No.: US 8,914,464 B2
(45) Date of Patent: Dec. 16, 2014

(54) INFORMATION PROCESSING DEVICE, INFORMATION PROCESSING METHOD, AND INFORMATION PROCESSING SYSTEM

(75) Inventor: Yasunori Nagatomo, Tokyo (JP)

(73) Assignee: Sony Corporation (JP)

( * ) Notice: Subject to any disclaimer, the term of this patent is extended or adjusted under 35 U.S.C. 154(b) by 294 days.

(21) Appl. No.: 13/111,754

(22) Filed: May 19, 2011

(65) Prior Publication Data

US 2011/0295972 A1 Dec. 1, 2011

(30) Foreign Application Priority Data

May 28, 2010 (JP) ................................ P2010-122851

(51) Int. Cl.
*G06F 15/16* (2006.01)
*H04L 12/28* (2006.01)
*H04L 29/08* (2006.01)
*H04W 4/18* (2009.01)

(52) U.S. Cl.
CPC ............. *H04L 12/2812* (2013.01); *H04W 4/18* (2013.01); *H04L 2012/2849* (2013.01); *H04L 67/1002* (2013.01); *H04L 67/2823* (2013.01)
USPC ........................................ 709/217; 709/219

(58) Field of Classification Search
USPC .................................. 709/217, 219
See application file for complete search history.

(56) References Cited

U.S. PATENT DOCUMENTS

| | | | | |
|---|---|---|---|---|
| 2008/0177822 | A1* | 7/2008 | Yoneda | 709/202 |
| 2009/0100492 | A1* | 4/2009 | Hicks et al. | 725/127 |
| 2009/0165061 | A1* | 6/2009 | Yamashita | 725/82 |
| 2010/0042688 | A1* | 2/2010 | Maghraby | 709/206 |

FOREIGN PATENT DOCUMENTS

| | | |
|---|---|---|
| JP | 10-164449 A | 6/1998 |
| JP | 2010-067097 A | 3/2010 |

* cited by examiner

*Primary Examiner* — Phirin Sam
*Assistant Examiner* — Mariela Vidal Carpio
(74) *Attorney, Agent, or Firm* — Lerner, David, Littenberg, Krumholz & Mentlik, LLP

(57) ABSTRACT

There is provided an information processing device including a storage unit configured to store system-compliant content data and other information, a content data providing unit configured to acquire the system-compliant content data from the storage unit, a system-compliant content playback unit configured to play back a content provided by the content data providing unit, a system-noncompliant content playback unit configured to directly play back system-noncompliant content data, and a content playback information transmitting unit configured to, in response to a playback request from a controller device, transmit to the controller device information for causing the system-noncompliant content playback unit to directly play back the system-noncompliant content data.

9 Claims, 10 Drawing Sheets

FIG. 5

```
<DIDL-Lite xmlns:dc="http://purl.org/dc/elements/1.1/"
xmlns:upnp="urn:schemas-upnp-org:metadata-1-0/upnp/"
xmlns:sample="urn:schemas-sample-org:metadata-1-0/sample/"
xmlns="urn:schemas-upnp-org:metadata-1-0/DIDL-Lite/">
  <item id="6" parentID="3" restricted="false" sample:uuid="uuid:12345678-1234-1234-1234-123456789abc">
    <dc:title>Sample Video 1</dc:title>
    <upnp:class>object.item.videoItem</upnp:class>
    <res protocolInfo="xxx.com:00000000-0000-0000-0000-000000000000:video/mpeg:localRender"/>
  </item>
</DIDL-Lite>
```

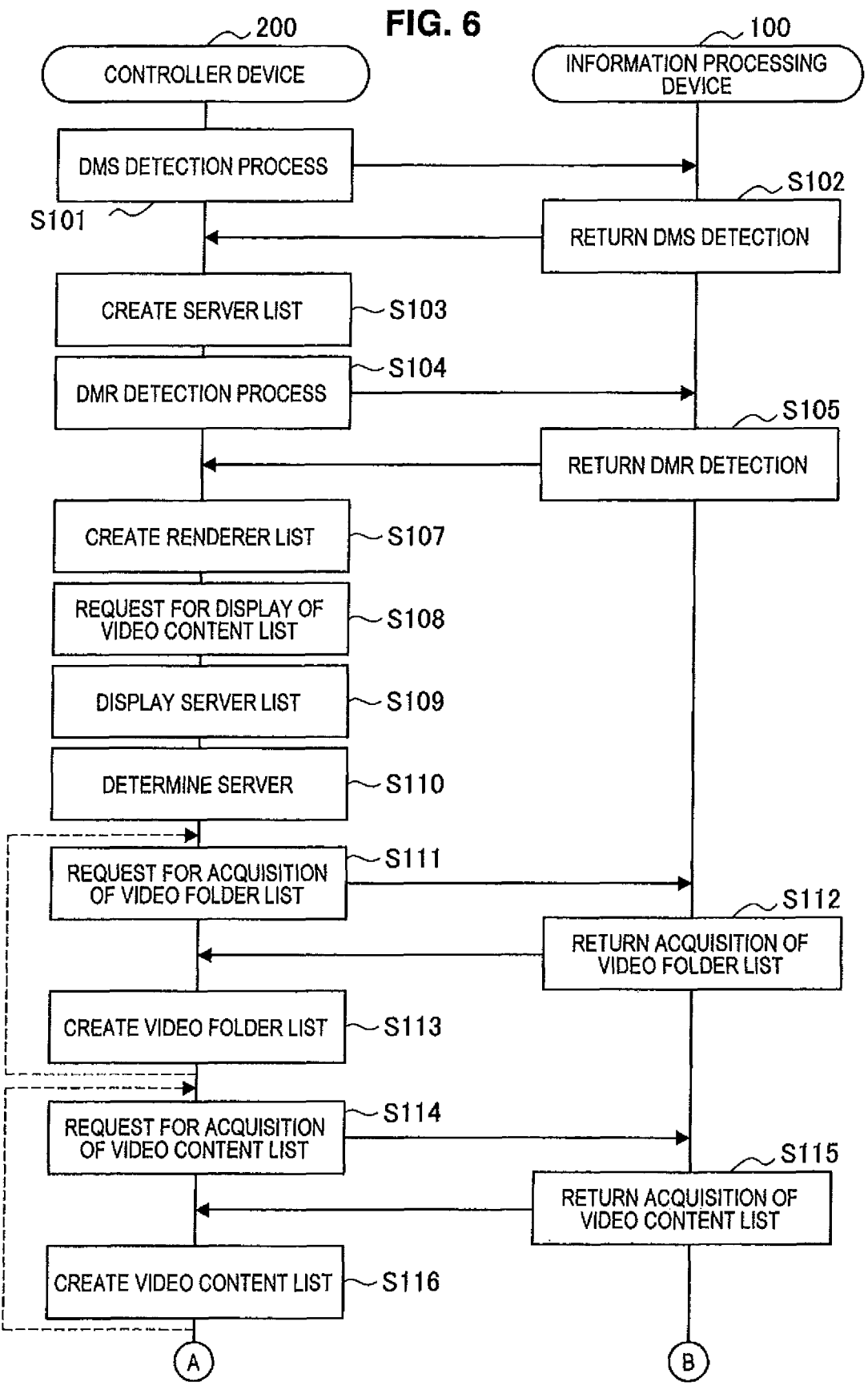

INFORMATION PROCESSING DEVICE, INFORMATION PROCESSING METHOD, AND INFORMATION PROCESSING SYSTEM

CROSS-REFERENCE TO RELATED APPLICATION

The present application claims priority from Japanese Patent Application No. JP 2010-122851 filed in the Japanese Patent Office on May 28, 2010, the entire content of which is incorporated herein by reference.

BACKGROUND OF THE INVENTION

1. Field of the Invention

The present invention relates to an information processing device, an information processing method, and an information processing system.

2. Description of the Related Art

With the current widespread use of data communications networks, so-called home networks have also been spreading, by which communication between devices can be performed in a home by connecting an electrical home appliance, a computer, and other peripheral devices either directly or over a network. The home networks provide convenience and comfort to users by allowing communication to be performed between the network-connected devices to thereby allow sharing of data processing functions of the devices and transfer of contents between the devices. Thus, the home networks are expected to become more widespread in the future.

For example, the system disclosed in JP H10-164449A allows sharing of contents between server/client devices so that the client device may acquire a content from the server and play back the content.

JP 2010-67097A or the like discloses a case in which the system as disclosed in JP H10-164449A is composed of the following three devices: (1) a content management server adapted to manage contents and transfer a content to another device over a network to allow the content to be played back on the other device, (2) a renderer device adapted to receive a content transferred from the content management server over the network and play back the content, and (3) a controller device configured to control playback or the like of a content on the renderer device by informing the renderer device about which content in the content management server should be played back. Specifically, JP 2010-67097A discloses a system that complies with the DLNA (Digital Living Network Alliance) that is the standard for building a home network using AV devices, personal computers, mobile devices, and the like.

SUMMARY OF THE INVENTION

Herein, if the (1) content management server and the (2) renderer device of the system disclosed in JP 2010-67097A are combined, it is conceivable that the (3) controller device can seamlessly control contents that are managed by the content management server (hereinafter also referred to as "system-compliant contents") and contents that are managed by the renderer device (hereinafter also referred to as "system-noncompliant contents").

However, there is a problem that if the content management server and the renderer device are simply combined, it would be impossible for the controller device to seamlessly control system-compliant contents that are managed by the content management server and system-noncompliant contents that are managed by the renderer device. The reason is generally as follows.

Thus far, what can be controlled by a controller device are only system-compliant contents that are managed by the content management server, and it has been impossible for the controller device to control system-noncompliant contents that are not managed by the content management server.

In addition, if the content management server and the renderer device are simply combined, it would be necessary for the content management server to convert system-noncompliant contents into system-compliant contents. However, as a system-compliant content may have a lower bit rate than a system-noncompliant content, if a system-noncompliant content is converted into a system-compliant content, the volume of information should be reduced. Further, there is another problem that since contents are distributed within a single device, a CPU load or memory usage could increase as compared to a case in which the renderer device alone plays back contents.

Further, if the content management server and the renderer device are simply combined, it would be impossible to provide the controller device with meta-information, which can be typically acquired from a content that is being played back on the renderer device, such as the Internet radio. Thus, the controller device is unable to know information on contents that are played back on the renderer device.

Furthermore, in the absence of information about if the system-noncompliant contents that are held by the renderer device can be played back on the renderer device, there is a possibility that, even if the renderer device cannot play back the system-noncompliant contents, the controller device may instruct the renderer device to play back the system-noncompliant contents.

In light of the foregoing, it is desirable to provide a novel and improved information processing device, information processing method, and information processing system that allow a controller device to seamlessly control system-compliant contents that are managed by a content management server and system-noncompliant contents that are managed by a renderer device.

According to an embodiment of the present invention, there is provided an information processing device including a storage unit configured to store system-compliant content data and playback content attribute information, the playback content attribute information having been transmitted from a controller device requesting for playback of the system-compliant content data, and the playback content attribute information including attribute information on the system-compliant content data requested to be played back and information for identifying the device that manages the system-compliant content data, a content data providing unit configured to, on the basis of the attribute information on the system-compliant content data included in the playback content attribute information stored in the storage unit, acquire from the storage unit the system-compliant content data requested to be played back by the controller device, a system-compliant content data acquisition unit configured to acquire the system-compliant content data provided by the content data providing unit, a system-compliant content playback unit configured to play back the system-compliant content data acquired by the system-compliant content data acquisition unit, a system-noncompliant content playback unit configured to directly play back system-noncompliant content data, and a content playback information transmitting unit configured to, in response to a playback request from the controller device, transmit to the controller device information for causing the system-noncompliant content playback unit to directly play back the system-noncompliant content data.

The content playback information transmitting unit may be configured to, each time new system-noncompliant content data is played back by the system-noncompliant content playback unit, transmit to the controller device information on the newly played-back system-noncompliant content data.

The information on the system-noncompliant content data that is played back by the system-noncompliant content playback unit and is transmitted to the controller device by the content playback information transmitting unit may be information on a content to be played back.

The information on the system-noncompliant content data that is played back by the system-noncompliant content playback unit and is transmitted to the controller device by the content playback information transmitting unit may be information on a playlist that includes a content to be played back.

The system-noncompliant content playback unit may be configured to decode the system-noncompliant content data to play back the system-noncompliant content data.

The information processing device may further include a content information converting unit configured to execute conversion between the system-compliant content data and the system-noncompliant content data.

According to another embodiment of the present invention, there is provided an information processing device including a server information acquisition unit configured to acquire server information from a content management server that manages content data corresponding to contents and attribute information on the content data, the server information including server identification information for identifying the content management server and a list of the content data, a playback device information acquisition unit configured to acquire playback device information from a playback device that acquires the content data from the content management server and plays back the content data, the playback device information including playback device identification information for identifying the playback device, a playback content determination unit configured to determine whether a content requested to be played back on the playback device is a system-compliant content managed by the content management server or a system-noncompliant content not managed by the content management server, and a content playback control unit configured to identify the playback device to play back content data selected from the list of the content data, transmit to the identified playback device playback content attribute information including attribute information on the selected content data and the server identification information on the content management server that manages the content data, and instruct the playback device to acquire the selected content data and play back the content data.

According to still another embodiment of the present invention, there is provided an information processing system including an information processing device configured to manage system-compliant content data and play back the system-compliant content data, and acquire system-noncompliant content data and play back the system-noncompliant data, and a controller device configured to control playback of the system-compliant content data and the system-noncompliant content data on the information processing device. The information processing device may include a storage unit configured to store playback content attribute information, the playback content attribute information having been transmitted from the controller device requesting for playback of the system-compliant content data, and the playback content attribute information including attribute information on the system-compliant content data requested to be played back and information for identifying a device that manages the system-compliant content data, a content data providing unit configured to, on the basis of the attribute information on the system-compliant content data included in the playback content attribute information stored in the storage unit, acquire from the storage unit the system-compliant content data requested to be played back by the controller device, a system-compliant content data acquisition unit configured to acquire the system-compliant content data provided by the content data providing unit, a system-compliant content playback unit configured to play back the system-compliant content data acquired by the system-compliant content data acquisition unit, a system-noncompliant content playback unit configured to directly play back system-noncompliant content data, the system-noncompliant content data not complying with the system, and a content playback information transmitting unit configured to transmit to the controller device information for causing the system-noncompliant content playback unit to directly play back the system-noncompliant content data. The controller device may include a server information acquisition unit configured to acquire server information from the information processing device that manages content data corresponding to contents and attribute information on the content data, the server information including server identification information for identifying the information processing device and a list of the content data, a playback device information acquisition unit configured to acquire playback device information from the information processing device that acquires the content data and plays back the content data, the playback device information including playback device identification information for identifying the information processing device, a playback content determination unit configured to determine whether a content requested to be played back on the information processing device is a system-compliant content managed by the information processing device or a system-noncompliant content not managed by the information processing device, and a content playback control unit configured to identify the information processing device to play back content data selected from the list of the content data, transmit to the identified information processing device playback content attribute information including attribute information on the selected content data and the server identification information on the information processing device that manages the content data, and instruct the information processing device to acquire the selected content data and play back the content data.

According to yet another embodiment of the present invention, there is provided an information processing method including a storing step of storing system-compliant content data and playback content attribute information, the playback content attribute information having been transmitted from a controller device requesting for playback of the system-compliant content data, and the playback content attribute information including attribute information on the system-compliant content data requested to be played back and information for identifying a device that manages the system-compliant content data, a content data providing step of acquiring, on the basis of the attribute information on the system-compliant content data included in the playback content attribute information stored in the storing step, the system-compliant content data stored in the storing step and requested to be played back by the controller device, a system-compliant content data acquiring step of acquiring the system-compliant content data provided in the content data providing step, a system-compliant content playback step of playing back the system-compliant content data acquired in the system-compliant content data acquisition step, a system-noncompliant content playback step of directly playing back system-noncompliant content data, and a content playback information transmitting step of transmitting to the controller device information for causing the system-noncompliant content data to be directly played back in the system-noncompliant content playback step.

According to further another embodiment of the present invention, there is provided an information processing method including a server information acquiring step of acquiring server information from a content management server that manages content data corresponding to contents and attribute information on the content data, the server information including server identification information for identifying the content management server and a list of the content data, a playback device information acquiring step of acquiring playback device information from a playback device that acquires the content data from the content management server and plays back the content data, the playback device information including playback device identification information for identifying the playback device, a playback content determination step of determining whether a content requested to be played back on the playback device is a system-compliant content managed by the content management server or a system-noncompliant content not managed by the content management server, and a content playback control step of identifying the playback device to play back content data selected from the list of the content data, transmitting to the identified playback device playback content attribute information including attribute information on the selected content data and the server identification information on the content management server that manages the content data, and instructing the playback device to acquire the selected content data and play back the content data.

According to the embodiments of the present invention described above, it is possible to provide a novel and improved information processing device, information processing method, and information processing system that allow a controller device to seamlessly control system-compliant contents that are managed by the content management server and system-noncompliant contents that are managed by the renderer device, by correlating the content management server and the renderer device with each other when the content management server and the renderer device are combined.

BRIEF DESCRIPTION OF THE DRAWINGS

FIG. 5 is an explanatory diagram showing an example of playback content attribute information;

FIG. 6 is a flowchart showing the operation of the information processing system 10 in accordance with one embodiment of the present invention;

DETAILED DESCRIPTION OF THE EMBODIMENTS

Figure 1:
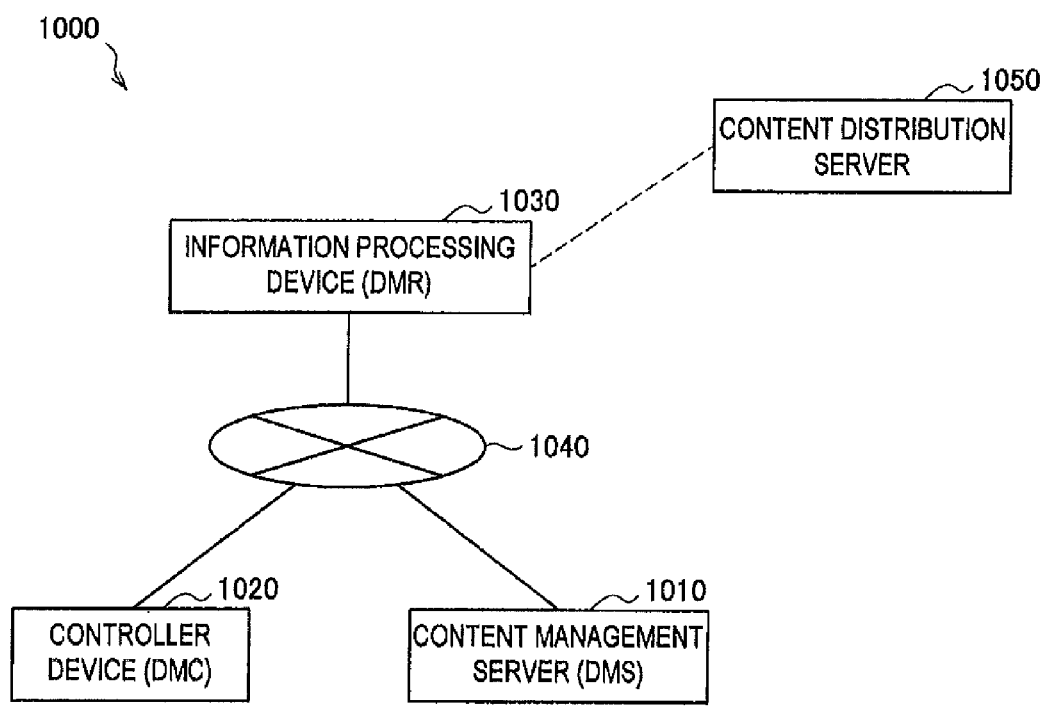
FIG. 1 is an explanatory diagram showing the configuration of a conventional information processing system 1000.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order.
 <1. Conventional Information Processing System>
 <2. One Embodiment of the Present Invention>
  [2-1. Configuration of the Information Processing System]
  [2-2. Configuration of the Information Processing Device]
  [2-3. Configuration of the Controller Device]
  [2-4. Operation of the Information Processing System]
 <3. Hardware Configuration>
 <4. Conclusion>
<1. Conventional Information Processing System>

First, prior to the detailed description of the preferred embodiments of the present invention, the configuration of the conventional information processing system disclosed in JP 2010-67097A will be described in conjunction with the problem that arises when the content management server and the renderer device are combined.

FIG. 1 is an explanatory diagram showing the configuration of a conventional information processing system 1000. The information processing system 1000 shown in FIG. 1 is a system that complies with the DLNA that is the standard for building a home network using AV devices, personal computers, mobile devices, and the like. Hereinafter, the configuration of the conventional information processing system 1000 will be described with reference to FIG. 1.

As shown in FIG. 1, the conventional information processing system 1000 includes a content management server 1010 that manages system-compliant contents, a controller device 1020 that controls playback of the system-compliant contents, and an information processing device 1030 that plays back the system-compliant contents.

The content management server 1010 stores contents such as photographs, music, and video, and is referred to as a digital media server (DMS) in the DLNA guidelines. The content management server 1010 manages a list of contents with a structure having folder tiers called a content directory service (CDS). Each content in the CDS is assigned an ID value for uniquely identifying the content, metadata that is the detailed information on the content, and a URL that indicates the source of acquisition of the content data. The CDS is visible to other devices on the home network 1040. A client device that intents to play back a content selects the content by searching through the CDS on the content management server 1010, acquires content data indicated by the URL from the content management server 1010, and plays back the content data. Herein, as a protocol used for communication (e.g., mutual communication such as acquisition of a list or acquisition of content data) between the content management server 1010 and the client device (the controller device 1020 or the information processing device 1030), HTTP (Hyper-Text Transfer Protocol) is employed.

The information processing device 1030 is a device dedicated to playing back contents that are requested by other devices without actively searching through the list of contents. In the DLNA guidelines, such a device is defined as a renderer (Digital Media Renderer: DMR). The information processing device 1030, when informed by the controller device 1020 of a URL of a content to be played back, acquires content data indicated by the URL using the HTTP, and plays back the content data.

The controller device 1020 is a device that performs an operation of, for example, requesting, playing back, stopping, or seeking a content on the information processing device 1030. In the DLNA guidelines, such a device is defined as a controller (Digital Media Controller: DMC). The controller device 1020 typically has a function of selecting a content by searching through the CDS on the content management server 1010. A content sharing/playback communication model that includes the DMS, DMC, and DMR as shown in FIG. 1 is referred to as a 3-box model.

Communication among the devices shown in FIG. 1 is performed on the basis of IPv4, and using a protocol (e.g., TCP/UDP or HTTP/SOAP) built thereon. Thus, it is presumed that hardware that implements each device has a communication function (typically, a wired LAN or a wireless LAN) that can handle the Internet protocol (IP).

The operation of the information processing system 1000 with a configuration such as shown in FIG. 1 is described in the aforementioned JP 2010-67097A. Thus, detailed description thereof is omitted herein, but a brief description thereof is as follows.

When the controller device 1020 has broadcast a predetermined packet over the home network 1040, and detected the content management server 1010 residing on the home network 1040, the content management server 1010 returns a predetermined response packet to the home network 1040. Then, the controller device 1020 creates a server list on the basis of the predetermined response packet from the content management server 1010.

Likewise, when the controller device 1020 has broadcast a predetermined packet over the home network 1040 and detected the information processing device 1030 residing on the home network 1040, the information processing device 1030 returns a predetermined response packet to the home network 1040. Then, the controller device 1020 creates a renderer list on the basis of the predetermined response packet from the information processing device 1030.

The controller device 1020 selects a single content management server 1010 from the server list that the controller device 1020 has created, and displays a list of contents that are stored in the content management server 1010. Then, when a user of the controller device 1020 has selected a content from the list of contents, the controller device 1020 determines the information processing device 1030 to play back the content stored in the content management server 1010. At this time, the controller device 1020 transmits information for playing back the content on the information processing device 1030 (e.g., attribute information such as a title of a video content to be played back, the size of the content, the length of the content, and a URL for accessing the content managed by the content management server 1010).

Then, when the controller device 1020 has transmitted an instruction to the information processing device 1030 to play back the content, the information processing device 1030 accesses the content management server 1010 on the basis of the information for playing back the content that has been transmitted from the controller device 1020, acquires the content from the content management server 1010, and executes a playback process.

As described above, through the operations of the content management server 1010, the controller device 1020, and the information processing device 1030, the controller device 1020 can acquire information on system-compliant contents that are managed by the content management server 1010. Meanwhile, the information processing device 1030 can play back the system-compliant contents that are managed by the content management server 1010 under the control of the controller device 1010.

Conventionally, it has been only the system-compliant contents stored and managed by the content management server 1010 that can be subjected to the operation performed by the controller device 1020 on the information processing device 1030, such as requesting, playing back, stopping, or seeking a content. Thus, it has been impossible to control, for example, system-noncompliant contents that are locally played back on a device mounted on the information processing device 1030.

For example, FIG. 1 shows a content distribution server 1050. Herein, the content distribution server 1050 is a server that distributes contents over a network, such as the Internet radio. Provided that the information processing device 1030 has a function of locally playing back contents (system-noncompliant contents) that are distributed from the content distribution server 1050 by accessing the content distribution server 1050, the controller device 1020 cannot control such system-noncompliant contents.

Thus, one embodiment of the present invention proposes a configuration that can control the system-noncompliant contents that are locally played back on the DMR.

<2. One Embodiment of The Present Invention>

[2-1. Configuration of the Information Processing System]

Figure 2:
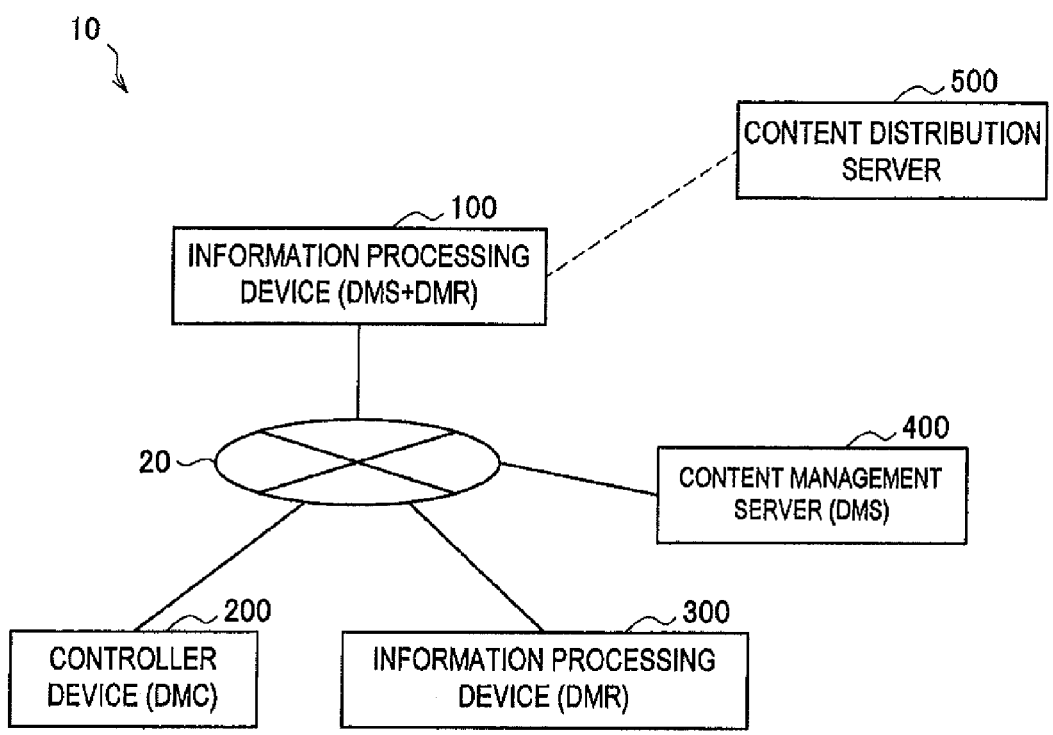
FIG. 2 is an explanatory diagram showing the configuration of an information processing system 10 in accordance with one embodiment of the present invention.

FIG. 2 is an explanatory diagram showing the configuration of an information processing system 10 in accordance with one embodiment of the present invention. The information processing system 10 shown in FIG. 2 is a system that complies with the DLNA that is the standard for building a home network using AV devices, personal computers, mobile devices, and the like, as with the information processing system 1000 shown in FIG. 1. Hereinafter, the configuration of the information processing system 10 in accordance with one embodiment of the present invention will be described with reference to FIG. 2.

As shown in FIG. 2, the information processing system 10 in accordance with one embodiment of the present invention includes an information processing device 100, a controller device 200, an information processing device 300, and a content management server 400.

The information processing device 100 is a combination of the content management server 1010 (DMS) and the information processing device 1030 (DMR) in the information processing system 1000 shown in FIG. 1, and has both the function of the DMS and the function of the DMR. Thus, the information processing device 100 manages contents such as video contents, music contents, and photo contents while correlating them with the location information and metadata thereon, for example. The information processing device 100, in response to a request from the controller device 200 or the information processing device 300 connected over a network 20, provides a content, metadata on the content, and the like that are managed by the information processing device 100. This information processing device 100 can be a computer device such as a personal computer or a server; or a home information appliance with a function of performing communication over a network, such as a television receiver, a DVD/HDD recorder, a portable phone, a PDP (Personal Digital Assistant), a digital camera, a home game machine, or a digital video camera. Alternatively, the information processing device 100 can be a portable device that can be carried about by a subscriber, such as a portable game machine, a PHS, or a portable video/audio player. Note that the information processing device 100 is a device with the function of a digital media server (DMS) that complies with the DLNA guidelines.

The information processing device 100 also has functions of acquiring content data, which corresponds to a content requested by the controller device 200, from a server device (e.g., the content management server 400), and playing back the content data. This information processing device 100 can be a computer device such as a personal computer or a server; or a home information appliance with a function of performing communication over a network, such as a television receiver, a DVD/HDD recorder, a portable phone, a PDP, a digital camera, a home game machine, or a digital video camera. Alternatively, the information processing device 100 can be a portable device that can be carried about by a subscriber, such as a portable game machine, a PHS, or a portable video/audio player. This information processing device 100 is also a device with the function of a digital media renderer (DMR) that complies with the DLNA guidelines.

The controller device 200 is a device that can acquire a list of contents such as video contents, music contents, and photo contents from the information processing device 100 with the DMS function, and cause the information processing device 100 or 300 to play back a content selected from the list of contents. This controller device 200 can be a computer device such as a personal computer or a server; or a home information appliance with a function of performing communication over a network, such as a television receiver, a DVD/HDD recorder, a portable phone, a PDP (Personal Digital Assistant), a digital camera, a home game machine, or a digital video camera. Alternatively, the controller device 200 can be a portable device that can be carried about by a subscriber, such as a portable game machine, a PHS, or a portable video/audio player.

Note that the controller device 200 is a device with the function of a digital media controller (DMC) that complies with the DLNA (Digital Living Network Alliance) guidelines.

A content distribution server 500 is a server device that distributes contents over a network, such as the Internet radio. The information processing device 100 in accordance with this embodiment has functions of accessing the content distribution server 500 and locally playing back contents (system-noncompliant contents) that are distributed from the content distribution server 500.

In this embodiment, system-noncompliant contents that are locally played back on the information processing device 100 are also the subject of control by the controller device 200. That is, if the controller device 200 acquires information on a system-noncompliant content, which is locally played back on the information processing device 100, and transmits an instruction to the information processing device 100 to play back the content on the basis of the information, it becomes possible for the controller device 200 to seamlessly manage both system-compliant contents and system-noncompliant contents.

Described above with reference to FIG. 2 is the configuration of the information processing system 10 in accordance with one embodiment of the present invention. Although FIG. 2 shows a configuration in which the information processing system 10 includes the information processing device 300 and the content management server 400, the present invention is not limited to this example. Next, the configuration of the information processing device 100 in accordance with one embodiment of the present invention will be described.

[2-2. Configuration of the Information Processing Device]

Figure 3:
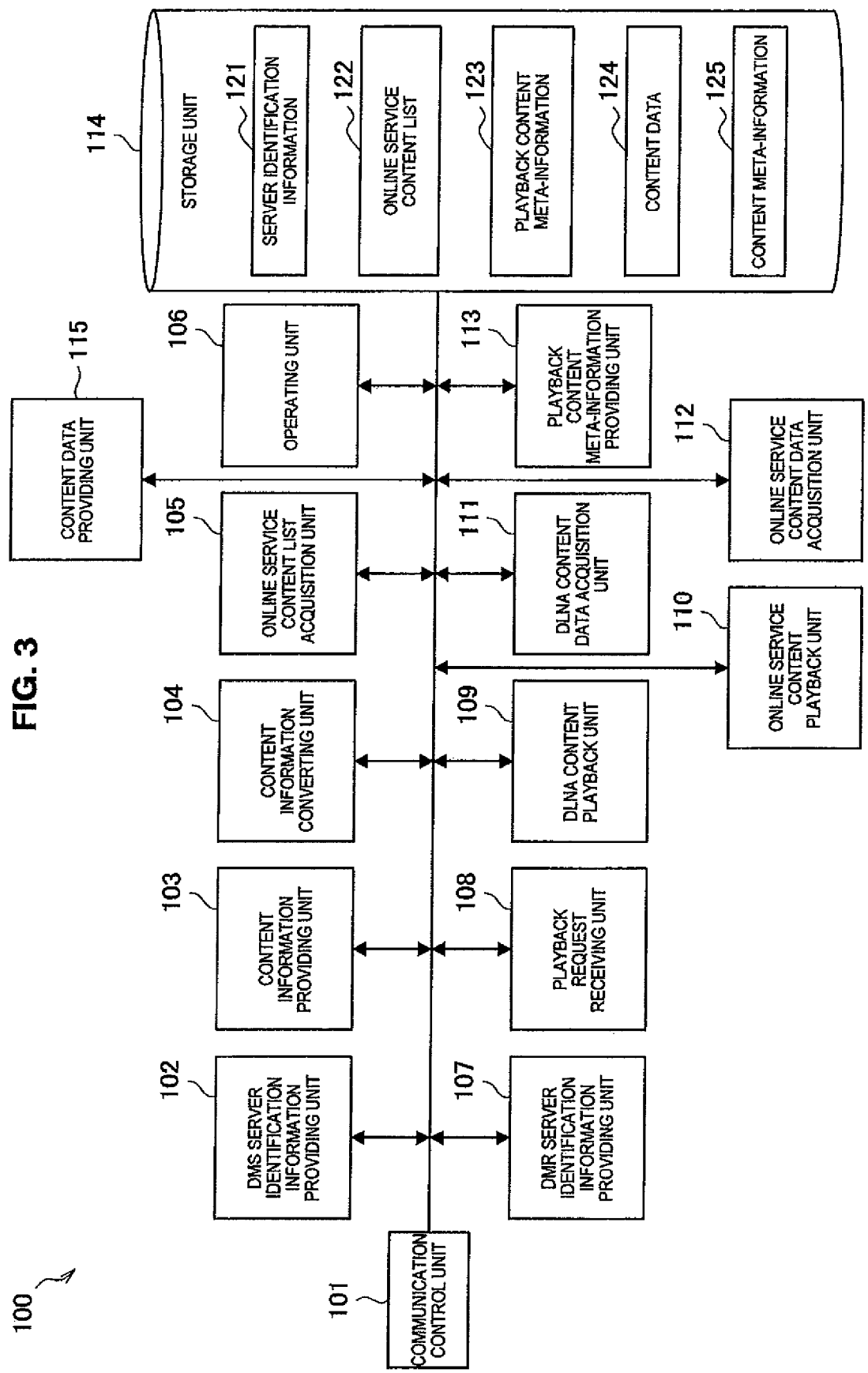
FIG. 3 is an explanatory diagram showing the configuration of an information processing device 100 in accordance with one embodiment of the present invention.

FIG. 3 is an explanatory diagram showing the configuration of the information processing device 100 in accordance with one embodiment of the present invention. Hereinafter, the configuration of the information processing device 100 in accordance with one embodiment of the present invention will be described with reference to FIG. 3.

As shown in FIG. 3, the information processing device 100 in accordance with one embodiment of the present invention includes a communication control unit 101, a DMS server identification information providing unit 102, a content information providing unit 103, a content information converting unit 104, an online service content list acquisition unit 105, an operating unit 106, a DMR server identification information providing unit 107, a playback request receiving unit 108, a DLNA content playback unit 109, an online service content playback unit 110, a DLNA content data acquisition unit 111, an online service content data acquisition unit 112, a playback content meta-information providing unit 113, a storage unit 114, and a content data providing unit 115.

The communication control unit 101 is, for example, a CPU (Central Processing Unit), ROM (Read Only Memory), RAM (Random Access Memory), or a communication device. The communication control unit 101 controls communication of various data transmitted and received between the information processing device 100 and the controller device 200.

More specifically, the communication control unit 101, in response to a request from each unit of the controller device 200 in accordance with this embodiment, transmits various data or signals to the controller device 200. If the information processing system 10 includes the information processing device 300 and the content management server 400, the communication control unit 101 also transmits various data or signals to such devices. In addition, the communication control unit 101 also receives various data or signals transmitted from the controller device 200 or the like, and transmits the data or signals to each unit of the information processing device 100 in accordance with this embodiment. Further, the communication control unit 101 can use the storage unit 114 (described later) as a transmission/reception buffer.

The DMS server identification information providing unit 102 is, for example, a CPU, ROM, or RAM, and transmits server identification information for identifying the information processing device 100, which functions as a DMS, to the controller device 200. This server identification information is information unique to the information processing device 100, and includes, for example, identification information such as an IP address assigned to the information processing device 100, a manufacturer name or a model name of the information processing device 100, and UUID (Universally Unique IDentifier) assigned to the information processing device 100. More specifically, the DMS server identification information providing unit 102, in response to a server discovery protocol that has been broadcast/distributed from the controller device 200 over the home network 20, transmits server identification information acquired from the storage unit 114 (described later) to the controller device 200.

Then, the DMS server identification information providing unit 102 provides the controller device 200 with information to the effect that the information processing device 100 is providing DMR contents that are locally played back on the information processing device 100. This information is described in the attribute information (described later) and provided to the controller device 200. The controller device 200 can, with reference to the attribute information transmitted from the information processing device 100, control local playback on the information processing device 100.

The content information providing unit 103 is, for example, a CPU, ROM, or RAM. The content information providing unit 103, in response to a request transmitted from the controller device 200 for the acquisition of various information, provides attribute information on content folders that are managed by the information processing device 100, attribute information on contents that are managed by the information processing device 100, or the like to the controller device 200. In addition, the content information providing unit 103, in response to a request transmitted from the DLNA content data acquisition unit 111 for the acquisition of content data, provides content data, which corresponds to a content managed by the information processing device 100, to the DLNA content data acquisition unit 111 via the communication control unit 101.

More specifically, the content information providing unit 103, in response to a request transmitted from the controller device 200 for the acquisition of a list of content folders or a list of contents, provides the requested information to the controller device 200 with reference to various information stored in the storage unit 114 (described later).

In addition, the content information providing unit 103, in response to a request transmitted from the DLNA content data acquisition unit 111 for the acquisition of content data corresponding to a specific content, acquires content data specified by the information processing device 100 from the storage unit 114, and provides the content data to the DLNA content data acquisition unit 111 via the communication control unit 101.

The content information converting unit 104 converts meta-information on a content (a system-noncompliant content) provided by the content distribution server 500 into meta-information in DLNA format. When the content information converting unit 104 converts meta-information on a content provided by the content distribution server 500 into meta-information in DLNA format, it becomes possible for the controller device 200 to acquire information on the content (the system-noncompliant content) provided by the content distribution server 500. In addition, the content information converting unit 104 can also convert meta-information in DLNA format into meta-information on a system-noncompliant content.

The content information converting unit 104, in converting meta-information on a system-noncompliant content into meta-information in DLNA format, acquires various information such as a title, category, icon, or playback time with reference to the meta-information on the system-noncompliant content, and applies the acquired information to the meta-information in DLNA format. Likewise, the content information converting unit 104 can also convert meta-information in DLNA format into meta-information on a system-noncompliant content.

The online service content list acquisition unit 105 accesses the content distribution server 500 via the communication control unit 101 to acquire a list of contents (system non-compliant contents) that are provided by the content distribution server 500. Upon acquisition of the list of contents with the online service content list acquisition unit 105, the aforementioned content information converting unit 104 converts the meta-information.

The operating unit 106 is, for example, a CPU, ROM, RAM, or an input device. The operating unit 106 converts an operation directed to a variety of input switches provided in the information processing device 100, such as a content selection switch, a playback switch, or a stop switch, into a predetermined signal, and transmits the signal to the relevant processing unit.

The DMR server identification information providing unit 107 is, for example, a CPU, ROM, or RAM, and provides the controller device 200 with information to the effect that contents provided by the information processing device 100, which also functions as a DMS, can be played back. This information is described in the attribute information (described later) and provided to the controller device 200. The controller device 200 can, with reference to the attribute information transmitted from the information processing device 100, control local playback on the information processing device 100.

The playback request receiving unit 108 is, for example, a CPU, ROM, or RAM, and receives a playback request from the controller device 200. The playback request receiving unit 108 determines whether a content requested to be played back by the controller device 200 is a system-compliant content or a system-noncompliant content. Then, the playback request receiving unit 108, on the basis of the determination result, instructs the DLNA content playback unit 109 or the online service content playback unit 110 (described later) to play back the content.

The DLNA content playback unit 109 performs a process of playing back data on a system-compliant content, which has been transmitted from the DLNA content data acquisition unit 111 (described later). More specifically, the DLNA content playback unit 109 decodes data on a system-compliant content transmitted from the DLNA content data acquisition unit 111, and performs a process of playing back data on the decoded system-compliant content. At this time, the DLNA content playback unit 109 can perform the process of playing back the system-compliant content while at the same time decoding the data on the system-compliant content. Alternatively, the DLNA content playback unit 109 can perform the process of playing back the system-compliant content upon completion of decoding the data on the system-compliant content. Note that the DLNA content playback unit 109 can use data, databases, and the like that are recorded on the storage unit 114 (described later).

The online service content playback unit 110 performs a process of playing back data on a system-noncompliant content that has been transmitted from the online service content data acquisition unit 112 (described later). More specifically, the online service content playback unit 110 decodes data on a system-noncompliant content that has been transmitted from the online service content data acquisition unit 112, and performs a process of playing back data on the decoded system-noncompliant content. At this time, the online service content playback unit 110 can perform a process of playing back the system-noncompliant content while at the same time decoding the data on the system-noncompliant content. Alternatively, the online service content playback unit 110 can perform a process of playing back the system-noncompliant content upon completion of decoding the data on the system-noncompliant content. Note that the online service content playback unit 110 can use data, databases, and the like that are recorded on the storage unit 114 (described later).

The DLNA content data acquisition unit 111 is, for example, a CPU, ROM, or RAM. The DLNA content data acquisition unit 111, on the basis of the attribute information on a content to be played back (hereinafter also referred to as playback content attribute information), which has been transmitted from the controller device 200, acquires from the storage unit 114 data on a system-compliant content that corresponds to a content identified from the playback content attribute information. The playback content attribute information transmitted from the controller device 200 is stored in the storage unit 114 (described later). Thus, the DLNA content data acquisition unit 111 can, on the basis of playback content meta-information 123 stored in the storage unit 114, acquire data on the corresponding system-compliant content. Then, the DLNA content data acquisition unit 111 transmits the data on the system-compliant content managed by the information processing device 100, which has been acquired from the storage unit 114, to the aforementioned DLNA content playback unit 109.

The online service content data acquisition unit 112 is, for example, a CPU, ROM, or RAM. The online service content data acquisition unit 112, on the basis of playback content attribute information transmitted from the controller device 200, acquires from the content distribution server 500 data on a system-noncompliant content that corresponds to a content identified from the playback content attribute information. The playback content attribute information transmitted from the controller device 200 is stored in the storage unit 114 (described later). Thus, the online service content data acquisition unit 112 can, on the basis of an online service content list 122 stored in the storage unit 114, acquire data on the corresponding system-noncompliant content from the content distribution server 500. Then, the online service content data acquisition unit 112 transmits to the aforementioned online service content playback unit 110 the data on the system-noncompliant content acquired from the content distribution server 500.

The playback content meta-information providing unit 113 is, for example, a CPU, ROM, or RAM. The playback content meta-information providing unit 113 transmits to the controller device 200 playback content attribute information that corresponds to a content currently played back on the information processing device 100. More specifically, the playback content meta-information providing unit 113, in response to a request transmitted from the controller device 200 via the home network 20 for the acquisition of playback content attribute information, transmits to the controller device 200 playback content meta-information that corresponds to the currently played back content that has been acquired from the storage unit 114 (described later).

The playback content meta-information providing unit 113 transmits to the controller device 200 not only information on DLNA contents that are played back by the DLNA content playback unit 109 but also information on system-noncompliant contents that are played back by the online service content playback unit 110. As the playback content meta-information providing unit 113 also transmits to the controller device 200 information on system-noncompliant contents that are played back by the online service content playback unit 110, the controller device 200 can, even when the information processing device 100 is playing back a system-noncompliant content, acquire information on the system-noncompliant content played back on the information processing device 100. Note that examples of the information transmitted by the playback content meta-information providing unit 113 include information on a content that is currently played back, information on a content to be played back, and information on a playlist including a content that is currently played back or a content to be played back.

The storage unit 114 stores various information for identifying the information processing device 100, and attribute information having described therein the types and the like of contents that can be played back on the information processing device 100. The storage unit 114 also stores server identification information 121 for identifying the information processing device 100 when the information processing device 100 functions as a DMS, the playback content meta-information 123 transmitted from the controller device 200, content data 124 on the system-compliant contents that are managed by the information processing device 100, and content meta-information 125.

In addition, the storage unit 114 can also have recorded thereon, as appropriate, various parameters, process history, and the like that become necessary to be stored while the information processing device 100 in accordance with this embodiment is performing some process; various databases; and the like. Each unit of the information processing device 100 shown in FIG. 3 can freely read or write to the storage unit 114.

The content data providing unit 115 is, for example, a CPU, ROM, or RAM. The content data providing unit 115, in response to a request transmitted from the controller device 200 for playback of a system-compliant content, provides the system-compliant content managed by the information processing device 100 to the DLNA content data acquisition unit 111.

More specifically, the content data providing unit 115, in response to a request transmitted from the controller device 200 for playback of a system-compliant content, acquires the content data 124 stored in the storage unit 114 (described later) and provides the acquired content data 124 to the DLNA content data acquisition unit 111.

Described above with reference to FIG. 3 is the configuration of the information processing device 100 in accordance with one embodiment of the present invention. Next, the configuration of the controller device 200 in accordance with one embodiment of the present invention will be described.

[2-3. Configuration of the Controller Device]

Figure 4:
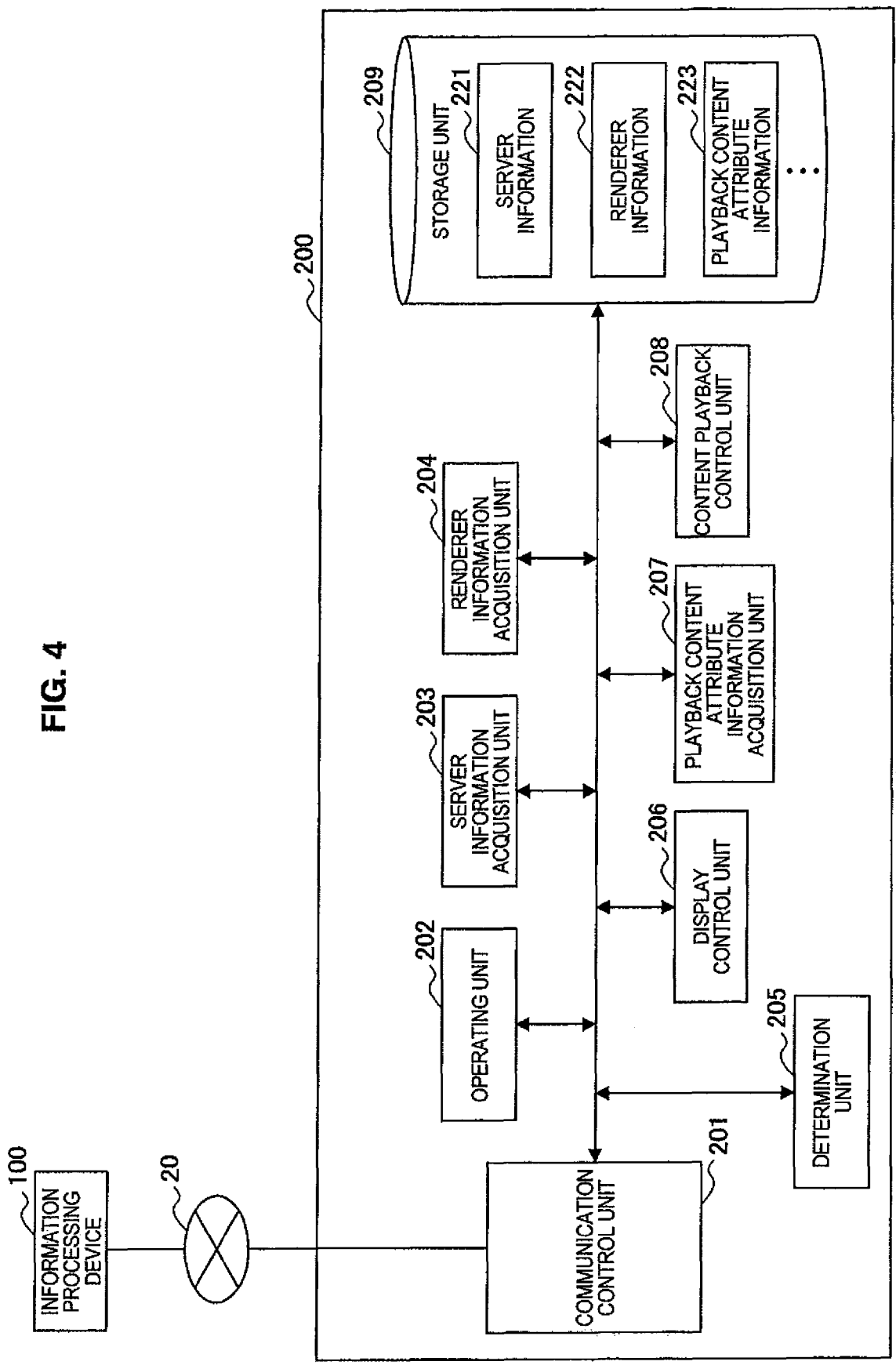
FIG. 4 is an explanatory diagram showing the configuration of a controller device 200 in accordance with one embodiment of the present invention.

FIG. 4 is an explanatory diagram showing the configuration of the controller device 200 in accordance with one embodiment of the present invention. Hereinafter, the configuration of the controller device 200 in accordance with one embodiment of the present invention will be described with reference to FIG. 4.

As shown in FIG. 4, the controller device 200 in accordance with one embodiment of the present invention includes a communication control unit 201, an operating unit 202, a server information acquisition unit 203, a renderer information acquisition unit 204, a determination unit 205, a display control unit 206, a playback content attribute information acquisition unit 207, a content playback control unit 208, and a storage unit 209.

The communication control unit 201 is, for example, a CPU, RAM, or a communication device. The communication control unit 201 controls communication of various data transmitted and received between the controller device 200 and the information processing device 100.

More specifically, the communication control unit 201, in response to a request from each unit of the controller device 200 in accordance with this embodiment, transmits various data or signals to the information processing device 100. In addition, the communication control unit 201 also receives various data or signals transmitted from the information processing device 100, and transmits the data or signals to each unit of the controller device 200 in accordance with this embodiment. Further, the communication control unit 201 can use the storage unit 209 (described later) as a transmission/reception buffer.

The operating unit 202 is, for example, a CPU, ROM, RAM, or an input device. The operating unit 202 converts an operation directed to a variety of input switches (not shown) provided in the controller device 200, such as a content selection switch, a playback switch, or a stop switch, into a predetermined signal, and transmits the signal to the relevant processing unit. Examples of the aforementioned operation directed to the input switch include an operation for acquiring attribute information on a content from the information processing device 100 with the DMS function, and an operation for playing back/stopping a specific content on a specific information processing device 100 with the DMR function.

The server information acquisition unit 203 is, for example, a CPU, ROM, or RAM. The server information acquisition unit 203 acquires from the information processing device 100 connected over the home network 20 server information on the information processing device 100.

More specifically, the server information acquisition unit 203 broadcasts a server discovery protocol over the home network 20, using a protocol such as SSDP (Simple Service Discovery Protocol), and acquires server identification information from the information processing device 100 that has returned a response. Examples of the server identification information herein include identification information such as an IP address assigned to the information processing device 100, a manufacturer name or a model name of the information processing device 100, and UUID (Universally Unique IDentifier) assigned to the information processing device 100.

In addition, the server information acquisition unit 203 transmits a request to the information processing device 100 for the acquisition of a list of content folders that are managed by the information processing device 100, using a protocol such as SOAP, and acquires the list of content folders that are managed by the information processing device 100. Further, the server information acquisition unit 203 transmits a request to the information processing device 100 for the acquisition of a list of contents that are managed by the information processing device 100, and acquires the list of contents that are managed by the information processing device 100. Such information on the content folders or information on the contents includes attribute information, location information, and the like on the relevant folders or contents.

Server information 221, which includes the server identification information, the attribute information on the contents managed by the server, and the like, acquired by the server information acquisition unit 203 is recorded on a server information recording area of the storage unit 209 (described later) while being correlated with information on the time or the like when the serve information 221 was acquired. Such server information 221 can be freely referenced by each unit of the controller device 200 in accordance with this embodiment.

The server information acquisition unit 203 can, on the basis of the acquired server identification information and attribute information on the contents, create a server list that is a list of servers that the controller device 200 can connect to, a content folder list that is a list of content folders that the controller device 200 can connect to, a content list that is a list of contents that the controller device 200 can acquire, and the like.

The server information acquisition unit 203 can transmit the thus created lists to the display control unit 206 (described later) so that the lists can be displayed on a display unit (not shown) of the controller device 200. In addition, the server information acquisition unit 203 can also record the created lists on the storage unit 209 (described later).

The server information acquisition unit 203 can, in performing the aforementioned processes, reference various parameters or databases recorded on the storage unit 209 (described later) or the like, or execute various programs recorded on the storage unit 209 (described later) or the like.

The renderer information acquisition unit 204 is, for example, a CPU, ROM, or RAM, and acquires from the information processing device 100, which is connected over the home network 20 and also functions as a DMR, renderer information 222 on the information processing device 100.

More specifically, the renderer information acquisition unit 204 broadcasts a protocol for discovering an available renderer device over the home network 20 using a protocol such as SSDP, and acquires renderer identification information from the information processing device 100 that also functions as a DMR and has returned a response. Examples of the renderer identification information herein include identification information such as an IP address assigned to the information processing device 100 or a manufacturer name or a model name of the information processing device 100. Further, the renderer identification information can also include information such as UUID (Universally Unique IDentifier) assigned to the information processing device 100 that also functions as a DMR. The UUID as a DMR assigned to the information processing device 100 differs from the UUID as a DMS. Accordingly, the UUID as a DMR assigned to the information processing device 100 can be correlated with the UUID as a DMS.

The renderer information acquisition unit 204 can also acquire from the information processing device 100, which also functions as a DMR, information on the types of contents that can be played back on the information processing device 100, and the like.

The renderer information 222, which includes the renderer identification information and the like, acquired by the renderer information acquisition unit 204 is recorded on a renderer information recording area of the storage unit 209 (described later) while being correlated with information on the time or the like when the renderer information 222 was acquired. Such renderer information 222 can be freely referenced by each unit of the controller device 200 in accordance with this embodiment.

In addition, the renderer information acquisition unit 204 can, on the basis of the acquired renderer identification information and the like, create a renderer list that is a list of renderer devices that the controller device 200 can connect to.

The renderer information acquisition unit 204 can transmit the thus created list to the display control unit 206 (described later) so that the list can be displayed on the display unit (not shown) of the controller device 200. In addition, the renderer information acquisition unit 204 can also record the created list on the storage unit 209 (described later).

The renderer information acquisition unit 204 can, in performing the aforementioned processes, reference various parameters or databases recorded on the storage unit 209 or the like, or execute various programs recorded on the storage unit 209 (described later) or the like.

The determination unit 205 is, for example, a CPU, ROM, or RAM, and determines whether a content to be played back on the information processing device 101 is a system-compliant content or a system non-compliant content. The determination unit 205 determines whether a content selected from the list of contents, which has been transmitted from the information processing device 100, is a system-compliant content or a system-noncompliant content, and transmits appropriate information corresponding to the determination result to the information processing device 100 over the home network 20.

The display control unit 206 is, for example, a CPU, ROM, or RAM, and performs display control when each processing unit of the controller device 200 in accordance with this embodiment displays various data, information, or the like on the display unit (not shown). The display control unit 206 can, in performing the aforementioned processes, reference various parameters or databases recorded on the storage unit 209 (described later) or the like, or execute various programs recorded on the storage unit 209 (described later) or the like.

The playback content attribute information acquisition unit 207 is, for example, a CPU, ROM, or RAM, and performs control for, in response to an instruction of a user of the controller device 200, acquiring playback content attribute information corresponding to a content that is currently played back on the information processing device 100.

More specifically, the playback content attribute information acquisition unit 207, if a user has requested via the operating unit 202 that attribute information on a content, which is currently played back on the information processing device 100, be displayed, acquires from the information processing device 100 playback content attribute information corresponding to the content that is currently played back. Though the details will be described later, the storage unit 114 of the information processing device 100 stores the playback content attribute information transmitted from the content playback control unit 208 of the controller device 200. Thus, the information processing device 100 can, in response to a request from the playback content attribute information acquisition unit 207 of the controller device 200, return playback content attribute information corresponding to the content, which is currently played back, to the controller device 200. Accordingly, the playback content attribute information acquisition unit 207 can surely acquire the playback content attribute information corresponding to the content that is currently played back on the information processing device 100.

The playback content attribute information acquisition unit 207 can transmit the thus acquired playback content attribute information to the display control unit 206 (described later) so that the information can be displayed on the display unit (not shown) of the controller device 200.

As described above, the playback content attribute information herein includes not only the attribute information on a content but also the server identification information on the information processing device 100 that manages the content. Thus, the playback content attribute information acquisition unit 207 can also transmit the acquired playback content attribute information to the server information acquisition unit 203 to cause it to acquire a list of contents that are stored in the folder of the same information processing device 100 as the content. Further, the playback content attribute information acquisition unit 207 can also transmit the thus acquired list of contents to the display control unit 206 so that the list can be displayed on the display unit (not shown) of the controller device 200.

The playback content attribute information acquisition unit 207 can also record the acquired playback content attribute information 223 on the storage unit 209 (described later).

The playback content attribute information acquisition unit 207 can, in performing the aforementioned processes, reference various parameters or databases recorded on the storage unit 209 (described later) or the like, or execute various programs recorded on the storage unit 209 (described later) or the like.

The content playback control unit 208 is, for example, a CPU, ROM, or RAM, and performs control for causing the information processing device 100, which functions as the DMR and is selected by a user of the controller device 200, to play back a content that is also selected by the user.

More specifically, the content playback control unit 208, when the information processing device 100 to play back a content as well as a content to be played back on the information processing device 100 have been determined, generates playback content attribute information on the content that has been determined to be played back, and transmits the information to the information processing device 100. Examples of the playback content attribute information include attribute information such as a title of a content to be played back, the size of the content, the length of the content, and a URL for accessing the content. Further, the content playback control unit 208 of the controller device 200 in accordance with this embodiment adds the server identification information acquired by the aforementioned server information acquisition unit 203 to the playback content attribute information. Specifically, the content playback control unit 208 generates playback content attribute information, which includes the server identification information on the information processing device 100 functioning as a DMS in which the content to be played back is stored, and transmits the information to the information processing device 100 functioning as the DMR.

The content playback control unit 208, on the basis of the server information 221 recorded on the storage unit 209 (described later), generates the aforementioned playback content attribute information, and transmits, on the basis of the renderer information 222 recorded on the storage unit 209 (described later), the generated playback content attribute information. The content playback control unit 208 can also record the generated playback content attribute information on the storage unit 209 (described later).

The content playback control unit 208, when informed that the attribute information has been received by the information processing device 100 that the content playback control unit 208 has transmitted the playback content attribute information, transmits a content playback request to the information processing device 100. In addition, the content playback control unit 208 can also transmit a request to the information processing device 100, which is currently playing back a content, for stopping the content (i.e., a content stop request).

The content playback control unit 208 can, in performing the aforementioned processes, reference various parameters or databases recorded on the storage unit 209 (described later) or the like, or execute various programs recorded on the storage unit 209 (described later) or the like.

FIG. 5 is an explanatory diagram showing an example of the playback content attribute information that is generated by the content playback control unit 208 and transmitted to the information processing device 100 via the communication control unit 201. The playback content attribute information shown in FIG. 5 has described therein UUID (Universally Unique IDentifier) that is the server identification information on the information processing device 100 in which a content to be played back is stored. In the example shown in FIG. 5, UUID that is the server identification information is represented by the following 16-byte numerical value: "12345678-1234-1234-1234-123456789abc." Note that the playback content attribute information shown in FIG.

5 is merely an example for describing this embodiment. Thus, the description of the information and the like are not limited thereto.

In this embodiment, information for playing back a system-noncompliant content on the information processing device 100 is described as, for example: "<res protocolInfo="xxx.com:00000000-0000-0000-0000-000000000000:video/mpeg:localRender">." Herein, "xxx.com" indicates the vender extended information, and "00000000-0000-0000-0000-000000000000" indicates the UUID of the DMR to be paired with the DMS. Information on the UUID of the DMR to be paired with the DMS is transmitted in advance to the controller device 200 from the information processing device 100 functioning as the DMS.

The storage unit 209 stores the aforementioned server information 221, renderer information 222, and the like. The storage unit 209 also stores the playback content attribute information 223 on a content that is currently played back on the information processing device 100 and transmitted from the information processing device 100.

In addition, the storage unit 209 can also have recorded thereon, as appropriate, various parameters, process history, and the like that become necessary to be stored while the controller device 200 in accordance with this embodiment is performing some process; various databases; and the like. The storage unit 209 can be freely read or written by the communication control unit 201, the operating unit 202, the server information acquisition unit 203, the renderer information acquisition unit 204, the determination unit 205, the display control unit 206, the playback content attribute information acquisition unit 207, the content playback control unit 208, and the like.

Described above is an exemplary configuration of the controller device 200 in accordance with this embodiment. Each of the aforementioned components can be constructed from a general member or circuit, or hardware that is dedicated to performing the function of each component. Alternatively, the function of each component can entirely be performed by a CPU. Thus, a configuration to be used can be changed as appropriate according to the technology level when this embodiment is carried out.

Described above with reference to FIG. 4 is the configuration of the controller device 200 in accordance with one embodiment of the present invention. Next, the operation of the information processing system 10 in accordance with one embodiment of the present invention will be described.

[2-4. Operation of the Information Processing System]

Figure 7:
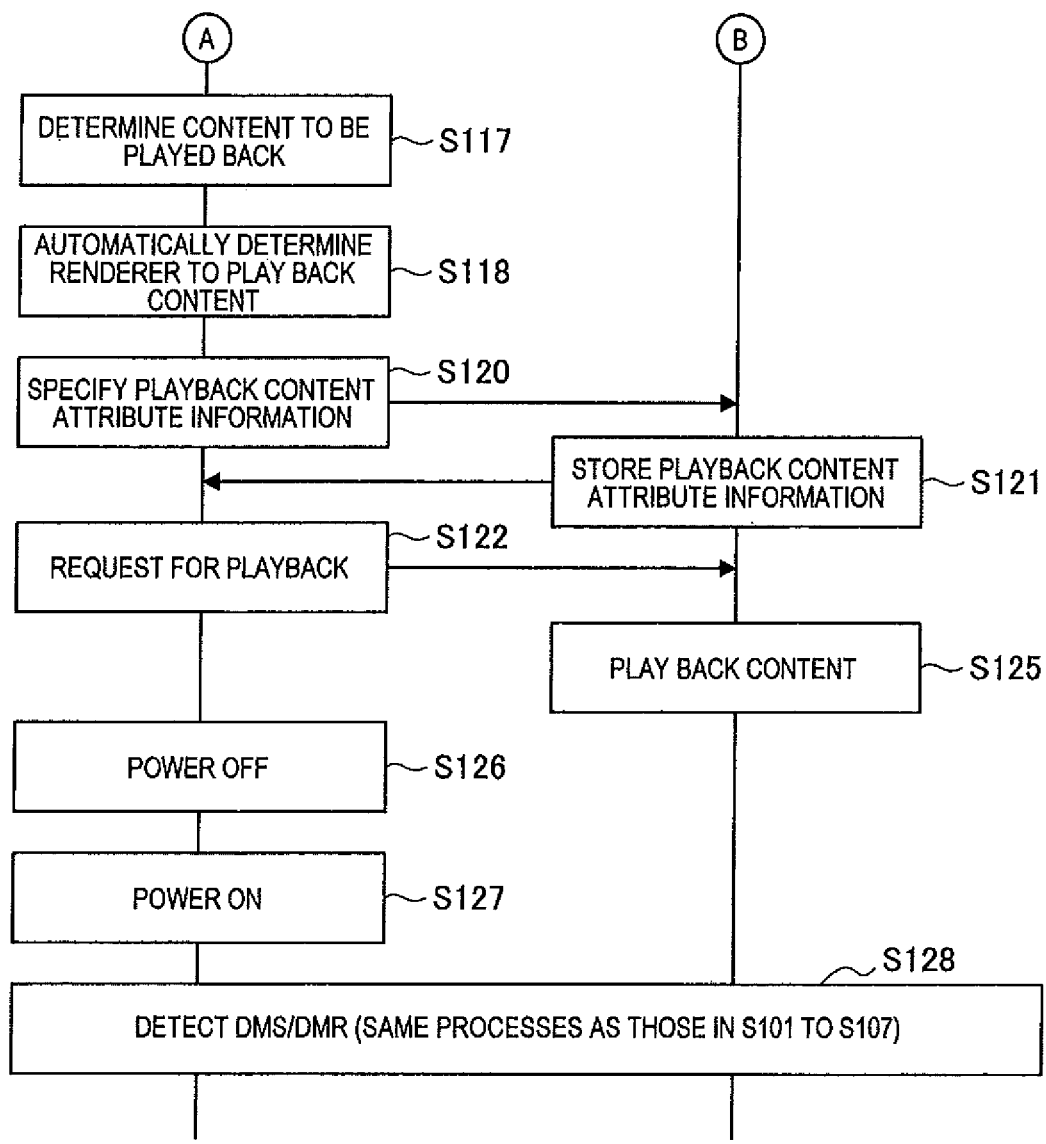
FIG. 7 is a flowchart showing the operation of the information processing system 10 in accordance with one embodiment of the present invention.

FIG. 6 and FIG. 7 are flowcharts showing the operation of the information processing system 10 in accordance with one embodiment of the present invention. Hereinafter, the operation of the information processing system 10 in accordance with one embodiment of the present invention will be described with reference to FIG. 6 and FIG. 7.

Note that FIG. 6 shows a case in which the controller device 200 plays back a system-compliant content such as a movie content or a music content, which is stored in the information processing device 100 functioning as a DMS, on the information processing device 100, and also plays back a system-noncompliant content such as a movie content or a music content, which is locally played back on the information processing device 100, on the information processing device 100.

First, the controller device 200 in accordance with this embodiment detects a DMS connected to the home network 20 (step S101). The server information acquisition unit 203 of the controller device 200 broadcasts a protocol for discovering an available server on the home network 20 via the communication control unit 201. For example, the controller device 200 uses SSDP as such a protocol for discovering an available server.

The DMS server identification information providing unit 102 of the information processing device 100, upon acquiring the server discovery protocol broadcast over the home network 20, creates a response packet that includes the server identification information 121 with reference to the storage unit 114, and returns the response packet to the controller device 200 via the communication control unit 101 (step S102). Note that another DMS (e.g., the content management server 400 shown in FIG. 2), in response to the server discovery protocol broadcast over the home network 20, also returns a response packet including its server identification information to the control device 200.

Next, the communication control unit 201 of the controller device 200 acquires from the information processing device 100 a response to the server discovery request, and the server information acquisition unit 203 stores the server identification information on the information processing device 100, which is included in the response, into the storage unit 209, and also creates a server list that is a list of the information processing devices 100, each of which functions as a DMS and has returned a response (step S103).

The controller device 200 detects a DMR connected to the home network 20 (step S104). The renderer information acquisition unit 204 of the controller device 200 broadcasts a protocol for discovering an available renderer device over the home network 20 via the communication control unit 201.

The DMR server identification information providing unit 107 of the information processing device 100, upon acquiring the renderer device discovery protocol broadcast over the home network 20, creates a response packet that includes the renderer information with reference to the storage unit 114, and returns the response packet to the controller device 200 via the communication control unit 101 (step S105). Note that another DMR (e.g., the information processing device 300 shown in FIG. 2), in response to the renderer device discovery protocol broadcast over the home network 20, also returns a response packet including its renderer information to the control device 200.

The renderer information acquisition unit 204 of the controller device 200, upon acquiring from the information processing device 100 a response to the renderer device discovery protocol, records the renderer information on each DMR, which is included in the response, on the storage unit 209, and also creates a renderer list as a list of DMRs that have returned a response (step S107).

Through the aforementioned steps S101 to S107, the controller device 200 knows the presence of the information processing device 100 connected over the home network 20.

Note that the aforementioned steps S101 to S107 are processes that are automatically executed when the controller device 200 is turned on, for example.

Next, a user of the controller device 200 requests for the display of a list of contents on the information processing device 100 by operating the operating unit 202 at a given timing (step S108). Then, the display control unit 206 of the controller device 200, on the basis of the signal transmitted from the operating unit 202, displays the server list created in step S103, which includes a manufacturer name, a model name, identification information, and the like of the information processing device 100, on the display unit (not shown) (step S109). The user selects a server having stored therein a content that he wants to play back (step 110). Note that FIG.

6 only shows a single information processing device 100 selected by a user for the sake of convenience of the description.

When the user of the controller device 200 has selected the information processing device 100 functioning as a DMS by operating the operating unit 202, the server information acquisition unit 203 of the controller device 200, on the basis of the signal transmitted from the operating unit 202, transmits a request to the information processing device 100 for the acquisition of a list of folders on the information processing device 100 (step S111). As the request for the acquisition of a list of folders, SOAP is used, and attribute information on video contents is attempted to be acquired with a command called "CDS: Browse," in particular.

The communication control unit 101 of the information processing device 100 acquires the request transmitted from the controller device 200 for the acquisition of a list of folders. The information processing device 100 has stored therein a plurality of contents, which are classified into folders. The content information providing unit 103 of the information processing device 100 acquires from the content meta-information 125 stored in the storage unit 114 folder information on contents that are managed by the information processing device 100, and returns the folder information to the controller device 200 (step S112).

Herein, the content information providing unit 103 of the information processing device 100 returns to the controller device 200 not only folder information on system-compliant contents that are managed by the information processing device 100 but also folder information on system-noncompliant contents that are locally played back on the information processing device 100. Accordingly, the controller device 200 can not only know folder information on system-compliant contents that are managed by the information processing device 100 but also know folder information on system-noncompliant contents that are locally played back on the information processing device 100.

The server information acquisition unit 203 of the controller device 200, upon receiving a response to the request for the acquisition of a list of folders, transmitted from the information processing device 100, creates a folder list with folder names and the like (S113), and displays the folder list on the display unit (not shown) via the display control unit 206. The user of the controller device 200 selects a folder containing a content that he wants to play back by operating the operating unit 202 while seeing the displayed folder list. Meanwhile, if there is (an)other folder(s) under the selected folder, the user operates the operating unit 202 to search through the folder tiers until a folder containing a content that he wants to play back is displayed. At this time, the server information acquisition unit 203 of the controller device 200 repeats the aforementioned steps S111 to S113 on the basis of the signal transmitted from the operating unit 202.

Next, the server information acquisition unit 203 of the controller device 200, on the basis of a predetermined signal generated by the operating unit 202, generates a request for the acquisition of a list of contents on the information processing device 100, and transmits the request to the information processing device 100 (step S114).

The content information providing unit 103 of the information processing device 100, upon receiving the request transmitted from the controller device 200 for the acquisition of a list of contents, acquires from the storage unit 114 the content meta-information 125 that is managed by the information processing device 100, and returns the content meta-information 125 to the controller device 200 (step S115).

Herein, the content information providing unit 103 of the information processing device 100 returns not only meta-information on system-compliant contents that are managed by the information processing device 100 but also meta-information on system-noncompliant contents that are locally played back on the information processing device 100. Accordingly, the controller device 200 can not only know system-compliant contents that are managed by the information processing device 100 but also know system-noncompliant contents that are locally played back on the information processing device 100.

The server information acquisition unit 203 of the controller device 200, upon receiving a response to the request for the acquisition of list of contents, transmitted from the information processing device 100, creates a content list with content titles and the like (S116), and displays the content list on the display unit (not shown) via the display control unit 206. The user of the controller device 200 selects a content that he wants to play back by operating the operating unit 202 while seeing the displayed content list. If there is a large number of contents and information on all of the contents cannot be acquired at a time, the controller device 200 repeats the aforementioned steps S114 to S116.

Thereafter, the user of the controller device 200 selects a content that he wants to play back by operating the operating unit 202 (step S117).

Through the aforementioned steps S108 to S117, the user of the controller device 200 can determine the content that he wants to play back on the DMR.

Next, the determination unit 205 of the controller device 200 determines whether the content selected in the aforementioned step S117 is a system-compliant content that is managed by the information processing device 100 functioning as a DMS or a content that is locally played back on the information processing device 100 functioning as a DMR (step S118). Through the determination with this determination unit 205, whether the selected content is a system-compliant content or a system-noncompliant content is determined depending on whether the content information (protocolInfo) acquired from the information processing device 100 in the aforementioned steps S114 to S116 has DMR information (UUID) added thereto, and, if the selected content is determined to be a system-noncompliant content, a DMR to play back the content is automatically determined on the basis of the added DMR information. Then, the controller device 200 searches for the DMR residing on the home network 20 on the basis of the DMR information, and if the DMR is available, instructs the DMR to play back the content. Hereinafter, description will be made of an example in which the selected content is a system-noncompliant content, and the DMR to play back the content is the information processing device 100.

Next, the content playback control unit 208 of the controller device 200 acquires attribute information on the content that has been determined to be played back, and generates playback content attribute information. At this time, the content playback control unit 208 of the controller device 200 adds information for identifying a server, which manages the content that has been determined to be played back, to the playback content attribute information. Then, the content playback control unit 208 of the controller device 200 informs the information processing device 100 of the thus generated playback content attribute information (step S120). This playback content attribute information is transmitted using a command called "AVT: SetAVTransportURI," for example. The playback content attribute information transmitted to the information processing device 100 includes, in addition to the information for identifying a server that manages a video content to be played back, attribution information such as a title, the size of the content, the length of the content, and a URL for accessing the content, for example.

The playback request receiving unit 108 of the information processing device 100, upon receiving the playback content attribute information transmitted from the controller device 200, stores the information into the storage unit 114 (step S121), and informs the controller device 200 that the playback content attribute information has been received.

The content playback control unit 208 of the controller device 200 requests the information processing device 100 to start play back of the selected content (step S122). This playback request is transmitted using a command called "AVT: Play."

The playback request receiving unit 108 of the information processing device 100, upon receiving the playback request, instructs the online service content data acquisition unit 112 to access the content distribution server 500. The online service content data acquisition unit 112 accesses the content distribution server 500 to acquire the requested content. Then, the online service content playback unit 110 plays back the content acquired by the online service content data acquisition unit 112 by, for example, displaying it on the display unit (not shown) (step S125). Note that the details of the process in step S125 will be described later.

As described above, steps S118 to S125 are the processes in which a content that has been determined to be played back by the controller device 200 is played back on the information processing device 100.

Herein, assume that the user has turned off the controller device 200 while video is being played back (step S126), and data such as the video attribute information, server identification information, renderer identification information, and playback content attribute information is lost. Under such circumstances, assume that the user of the controller 200 has turned on the controller device 200 again (step S127).

In such a case, the controller device 200 repeats the same processes as those in steps 101 to S107 to detect a DMS and a DMR (step S128), and acquires server identification information and renderer identification information again.

As described above, as the controller device 200 detects a DMS and a DMR, and acquires from the information processing device 100 functioning as the DMS system-compliant contents that are managed by the information processing device 100 functioning as the DMS, and also acquires information on contents that are locally played back on the information processing device 100 functioning as the DMR, it is possible for the controller device 200 to control the information processing device 100 functioning as the DMR to play back the contents to be locally played back on the information processing device 100.

Described above with reference to FIGS. 6 and 7 is the operation of the information processing system 10 in accordance with one embodiment of the present invention. Next, details of the content list acquisition process of the information processing device 100 shown in step S115 of FIG. 6 will be described.

Figure 8:
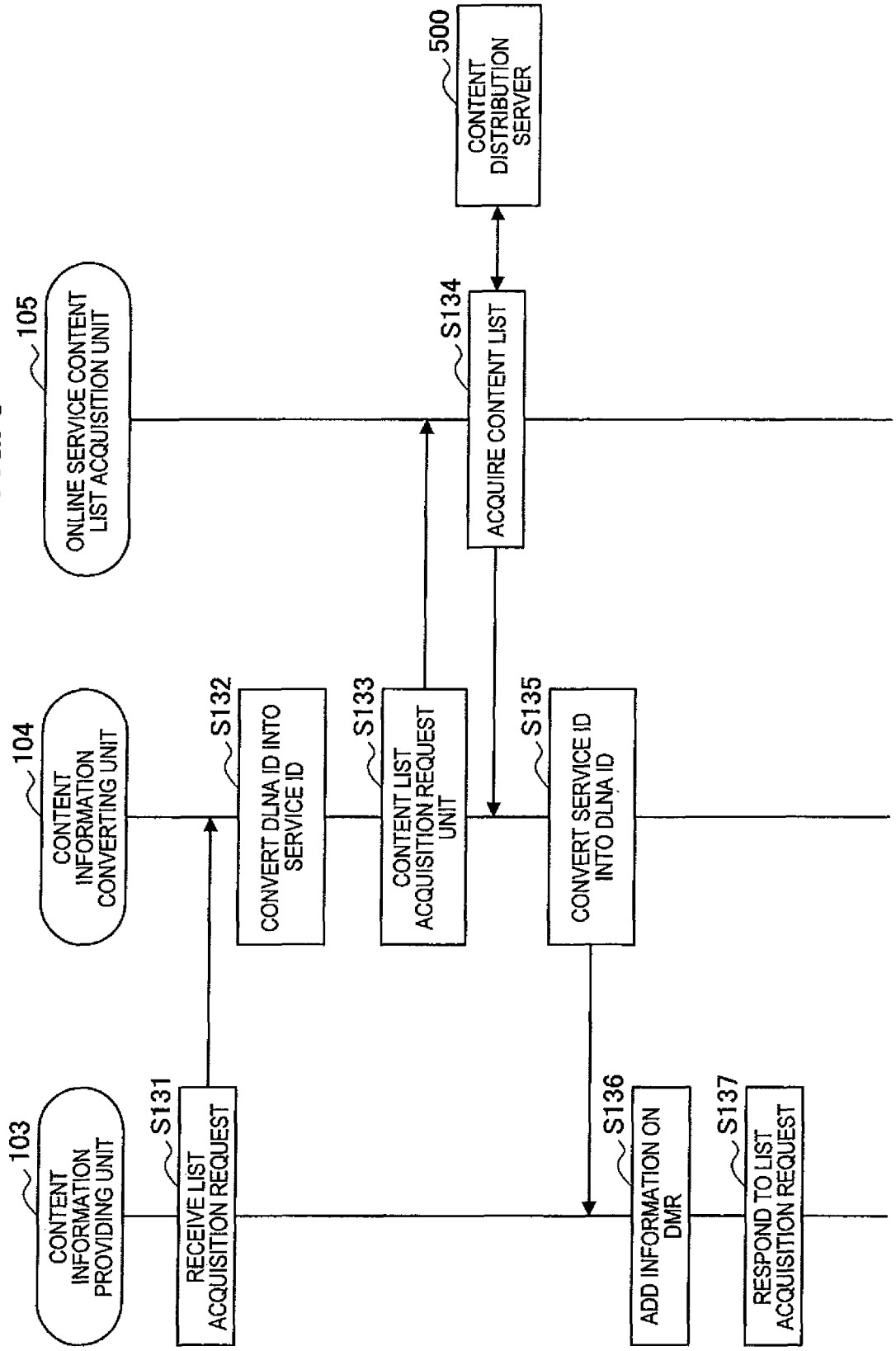
FIG. 8 is a flowchart showing the details of a content list acquisition process of the information processing device 100.

FIG. 8 is a flowchart showing the details of the content list acquisition process of the information processing device 100 shown in step S115 of FIG. 6. This content list acquisition process of the information processing device 100 is a process performed when the contents are system-noncompliant contents. Hereinafter, the details of the content list acquisition process of the information processing device 100 will be described with reference to FIG. 8.

The content information providing unit 103, upon receiving a content list acquisition request from the controller device 200 (step S131), informs the content information converting unit 104 that the content list acquisition request has been received from the controller device 200.

The content information converting unit 104, which is informed by the content information providing unit 103 that the content list acquisition request has been received from the controller device 200, executes a process of converting the DLNA ID (object ID) into an online service ID (step S132).

The content information converting unit 104, upon executing the process of converting the DLNA ID (object ID) into an online service ID, requests the online service content list acquisition unit 105 to acquire a content list from the content distribution server 500 on the basis of the converted ID (step S133).

The online service content list acquisition unit 105, upon receiving the content list acquisition request from the content information converting unit 104, acquires a content list from the content distribution server 500 on the basis of the ID converted in the aforementioned step S132 (step S134). The online service content list acquisition unit 105 transmits the content list acquired from the content distribution server 500 to the content information converting unit 104.

The content information converting unit 104, upon receiving the content list acquired from the content distribution server 500 by the online service content list acquisition unit 105, executes a process of converting the online service ID into a DLNA ID (step S135). The content information converting unit 104, upon executing the process of converting the online service ID into a DLNA ID, transmits information on the DLNA ID to the content information providing unit 103.

When the content information converting unit 104 has converted the online service ID into a DLNA ID, and the content information providing unit 103 has received information on the DLNA ID after the conversion, the content information providing unit 103 adds, to the DLNA ID, information (UUID) on the DMR (information processing device 100) that plays back a content with the ID (step S136). Then, the content information providing unit 103 returns the information on the DLNA ID as well as the information on the DMR (the information processing device 100) that plays back the content as a response to the list acquisition request to the controller device 200 (step S137).

As described above, the information processing device 100 can provide the controller device 200 with information on system-noncompliant contents, which are acquired from the content distribution server 500 to be locally played back on the information processing device 100, by returning information on the contents that have been acquired from the content distribution server 500 to the controller device 200. Thus, the controller device 200 that has received such information from the information processing device 100 can control local playback of the system-noncompliant contents on the information processing device 100.

Described above with reference to FIG. 8 are the details of the content list acquisition process of the information processing device 100. Next, the details of the content playback process of the information processing device 100 shown in step S125 of FIG. 7 will be described.

Figure 9:
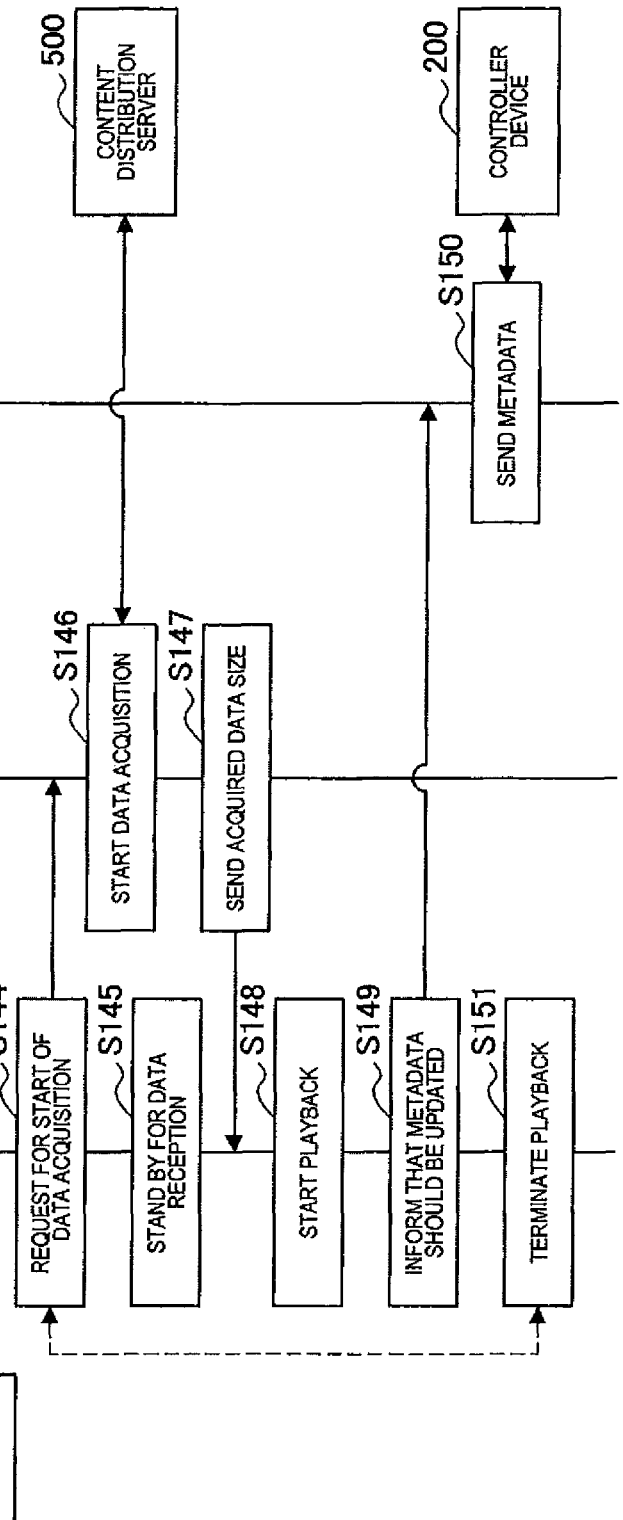
FIG. 9 is a flowchart showing the details of a content playback process of the information processing device 100 in accordance with one embodiment of the present invention.

FIG. 9 is a flowchart showing the details of the content playback process of the information processing device 100 in accordance with one embodiment of the present invention shown in step S125 of FIG. 7. Hereinafter, the details of the content playback process of the information processing device 100 in accordance with one embodiment of the present invention shown in step S125 of FIG. 7 will be described with reference to FIG. 9.

The playback request receiving unit 108, upon receiving a playback request from the controller device 200 (step S141), determines whether the content requested to be played back by the controller device 200 is a system-compliant content or a system-noncompliant content (step S142). Herein, description will be made on the assumption that the content requested to be played back by the controller device 200 is a system-noncompliant content. Note that the process performed when the content requested to be played back by the controller device 200 is a system-compliant content is disclosed in, for example, the aforementioned JP 2010-67097A.

The playback request receiving unit 108, upon determining that the content requested to be played back by the controller device 200 is a system-noncompliant content, transmits an instruction to the online service content playback unit 110 to play back a content of the online service (the content distribution server 500) (step S143). In the DLNA, a DMR typically acquires a content by accessing a DMS. However, in the example shown herein, the DMR acquires a content by directly accessing the online service (the content distribution server 500).

The online service content playback unit 110, upon receiving from the playback request receiving unit 108 the instruction to play back a content of the online service (the content distribution server 500), requests the online service content data acquisition unit 112 to start acquisition of the requested content data (step S144). The online service content playback unit 110, which has requested the online service content data acquisition unit 112 to start acquisition of the requested content data, enters a standby state for data reception (step S145).

The online service content data acquisition unit 112, upon receiving from the online service content playback unit 110 the request for the start of acquisition of the requested content data, accesses the content distribution server 500, and starts acquisition of the requested content data (step S146). When the online service content data acquisition unit 112 has acquired the content data from the content distribution server 500, the acquired content data is stored in the storage unit 114, and the online service content data acquisition unit 112 informs the online service content playback unit 110 of the size of the acquired data (step S147).

The online service content playback unit 110, which has been informed of the size of the acquired data by the online service content data acquisition unit 112, starts playback of the content that has been acquired from the content distribution server 500 by the online service content data acquisition unit 112 (step S148).

The online service content playback unit 110, upon starting playback of the content, informs the playback content meta-information providing unit 113 that the metadata should be updated along with the playback of the content (step S149).

The playback content meta-information providing unit 113, which has been informed by the online service content playback unit 110 that the metadata should be updated, transmits to the controller device 200 meta-information on the content that is currently played back by the online service content playback unit 110 (step S150). As the meta-information on the content that is currently played back by the online service content playback unit 110 is transmitted from the playback content meta-information providing unit 113 to the controller device 200, it is possible for the controller device 200 to know information on the content (system-noncompliant content) that is currently played back on the information processing device 100. Accordingly, such information can be displayed on the display unit (not shown).

The online service content playback unit 110, upon terminating the playback of the content (step S151), returns to the aforementioned step S144, and requests the online service content data acquisition unit 112 to acquire data on the next content. The information processing device 100 can play back contents (system non-compliant contents) by directly accessing the content distribution server 500 by repeating the aforementioned steps S144 to S151. In addition, the controller device 200 can, by once instructing the information processing device 100 to play back a content (a system-noncompliant content), adequately acquire information on the content that is currently played back on the information processing device 100.

Described above with reference to FIG. 9 are the details of the content playback process of the information processing device 100 in accordance with one embodiment of the present invention shown in step S125 of FIG. 7.

>3. Hardware Configuration<

Figure 10:
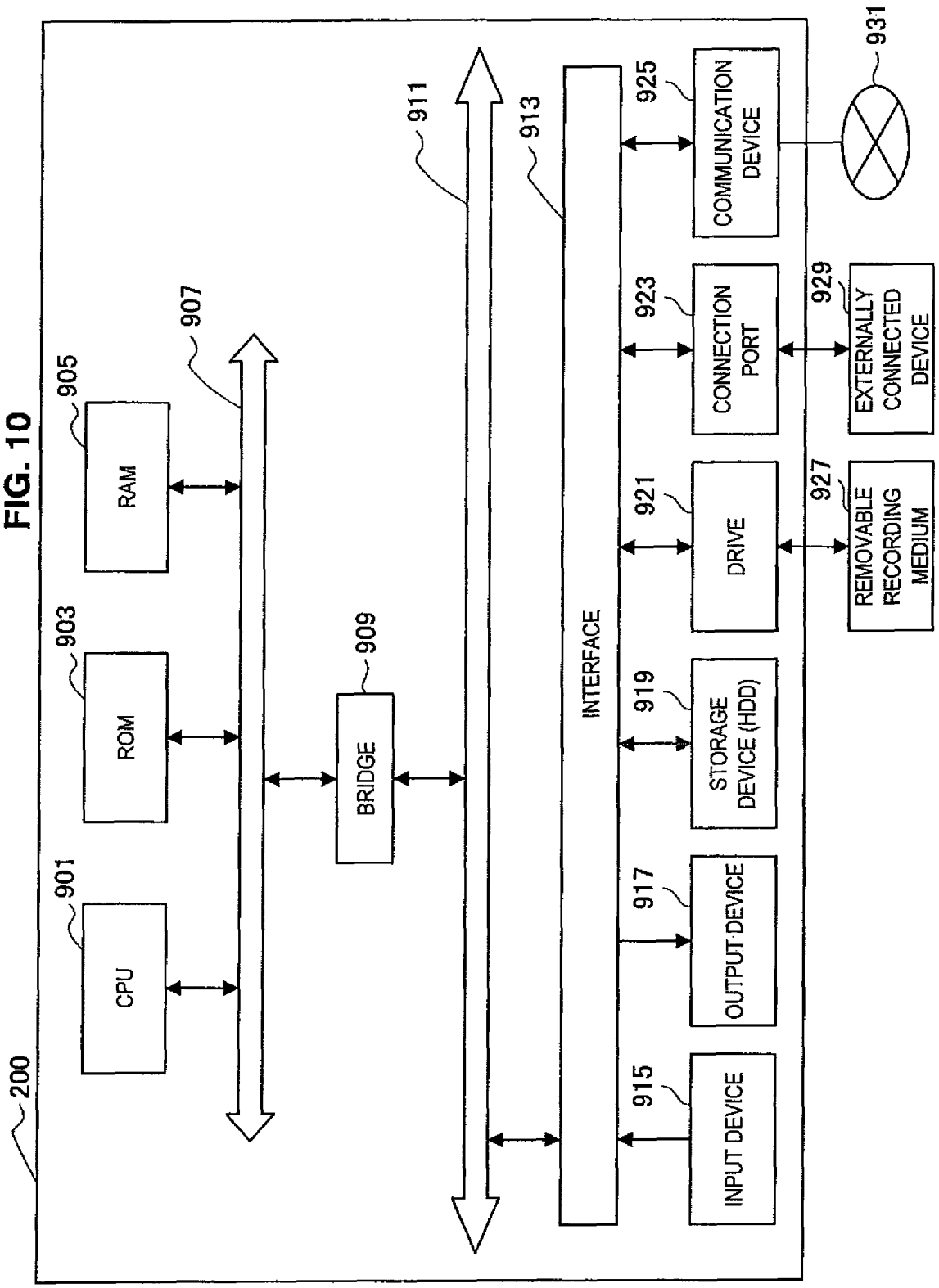
FIG. 10 is a block diagram for illustrating the hardware configuration of the controller device 200 in accordance with each embodiment of the present invention.

Next, the hardware configuration of the controller device 200 in accordance with each embodiment of the present invention will be described in detail with reference to FIG. 10. FIG. 10 is a block diagram for illustrating the hardware configuration of the controller device 200 in accordance with each embodiment of the present invention.

The controller device 200 mainly includes a CPU 901, ROM 903, RAM 905, a host bus 907, a bridge 909, an external bus 911, an interface 913, an input device 915, an output device 917, a storage device 919, a drive 921, a connection port 923, and a communication device 925.

The CPU 901 functions as an arithmetic processing unit and a control unit, and controls some or all of the operations within the controller device 200 in accordance with various programs recorded on the ROM 903, the RAM 905, the storage device 919, or a removable recording medium 927. The ROM 903 stores programs, operation parameters, and the like that are used by the CPU 901. The RAM 905 temporarily stores programs used for the execution of the CPU 901, parameters that change as appropriate during the execution, and the like. These components are mutually connected by the host bus 907 that is an internal bus such as a CPU bus.

The host bus 907 is connected to the external bus 911 such as a PCI (Peripheral Component Interconnect/Interface) bus via the bridge 909.

The input device 915 is an operating means to be operated by a user, such as a mouse, a keyboard, a touch panel, a button, a switch, or a lever. The input device 915 can be, for example, a remote control means (a so-called remote controller) that uses infrared rays or other radio waves. Alternatively, the input device 915 can be an externally connected device 929 that operates in accordance with the operation of the controller device 200, such as a portable phone or a PDA. As a further alternative, the input device 915 can be, for example, an input control circuit that generates an input signal on the basis of information input by a user with the aforementioned operating means, and outputs the signal to the CPU 901. Operating the input device 915, the user of the controller device 200 can input various data to the controller device 200 and instruct the controller device 200 to perform processing operations.

The output device 917 is a device that can visually or audibly inform a user of the acquired information, for example, a display device such as a CRT display device, a liquid crystal display device, a plasma display device, an EL display device, or a lamp; an audio output device such as a speaker or a head phone; a printer device; a mobile phone; or a facsimile. The output device 917 outputs, for example, results obtained by various processes performed by the controller device 200. Specifically, the display device displays results obtained by various processes performed by the controller device 200 with text or images. Meanwhile, the audio output device outputs an audio signal, which is composed of the played-back voice data, sound data, or the like, after converting it into an analog signal.

The storage device 919 is a device for storing data, constructed as an exemplary storage unit of the controller device 200. The storage device 919 is, for example, a magnetic storage unit device such as an HDD (Hard Disk Drive), a semiconductor storage device, an optical storage device, or a magneto-optical storage device. This storage device 919 stores programs and various data executed by the CPU 901, externally acquired sound signal data, image signal data, and the like.

The drive 921 is a reader/writer for a recording medium, and is incorporated in or externally attached to the controller device 200. The drive 921 reads information recorded on the mounted removable recording medium 927 such as a magnetic disk, an optical disc, a magneto-optical disk, or semiconductor memory, and outputs the information to the RAM 905. The drive 921 can also record data on the mounted removable recording medium 927 such as a magnetic disk, an optical disc, a magneto-optical disk, or semiconductor memory. The removable recording medium 927 can be, for example, a DVD medium, a Blu-ray medium, CompactFlash (CF: registered trademark), a memory stick, or a SD memory card (Secure Digital memory card). Alternatively, the removable recording medium 927 can be an IC card (Integrated Circuit card) with a contactless IC chip mounted thereon or an electric device, for example.

The connection port 923 is, for example, a port for directly connecting a device to the controller device 200, such as a USB (Universal Serial Bus) port, an IEEE 1394 port such as i.Link, a SCSI (Small Computer System Interface) port, an RS-232C port, an optical audio terminal, or an HDMI (High-Definition Multimedia Interface) port. With the externally connected device 929 connected to the connection port 923, the controller device 200 directly acquires sound signal data or image signal data from the externally connected device 929, or provides sound signal data or image signal data to the externally connected device 929.

The communication device 925 is, for example, a communication interface such as a communication device to be connected to a communications network 931. The communication device 925 is, for example, a communication card for a wired or wireless LAN (Local Area Network), Bluetooth, or WUSB (Wireless USB); an optical communication router; an ADSL (Asymmetric Digital Subscriber Line) router; or modems for various communications. The communication device 925 can, for example, transmit and receive signals and the like over the Internet or to/from other communication devices in accordance with a predetermined protocol such as TCP/IP. In addition, the communications network 931 connected to the communication device 925 is a wired or wirelessly connected network or the like such as, for example, the Internet, a home LAN, infrared communication, radio wave communication, or satellite communication.

Described above is an example of the hardware configuration that can implement the function of the controller device 200 in accordance with each embodiment of the present invention. Each of the aforementioned components can be constructed from a general member or hardware that is dedicated to performing the function of each component. Thus, a hardware configuration to be used can be changed as appropriate according to the technology level when this embodiment is carried out.

A hardware configuration that can implement the function of the information processing device 100 in accordance with the embodiments of the present invention can be realized with a similar function to that of the hardware configuration of the controller device 200 shown in FIG. 10. Thus, detailed description thereof is omitted herein. In addition, each component of the information processing device 100 can also be constructed from a general member or hardware that is dedicated to performing the function of each component. Thus, a hardware configuration to be used can be changed as appropriate according to the technology level when this embodiment is carried out.

<4. Conclusion>

As described above, according to one embodiment of the present invention, in a system that complies with the DLNA that is the standard for building a home network, a single device (the information processing device 100) is provided with the DMS function and the DMR function, and the controller device 200 controls playback of contents on the device. In this case, the information processing device 100 creates information (protocolInfo) for locally playing back a system-noncompliant content on the information processing device 100, and transmits the information to the controller device 200. When the controller device 200 has, on the basis of the information from the information processing device 100, selected a content to be played back on the information processing device 100, the information processing device 100 acquires, if the content selected by the controller device 200 is a system-compliant content, the content from the DMS, and acquires, if the selected content is a system-noncompliant content, the content from the online service (e.g., the content distribution server 500) and plays back the content.

Constructing the information processing system 10 as described above allows the DMR to directly access and play back a content without the need for the DMS to decode or distribute the content, and to play back the content with high quality. As the DMR directly accesses and plays back a content without the DMS decoding or distributing the content, it is possible to provide the DMC with metadata on a content that is currently played back. In addition, as the DMR directly accesses and plays back a content without the DMS decoding or distributing the content, it is possible to reduce the load on the system. Further, as the information on the integrated DMR is added to the content list information that is provided by the DMS to the DMC, it is possible to prevent a playback instruction from being erroneously issued to other typical DMRs.

Note that contents that are locally played back on the information processing device 100 are not limited to contents (system-noncompliant contents) that are distributed from the content distribution server 500. Contents that are stored in the information processing device 100 can also be system-noncompliant contents, or it is also possible to use system-noncompliant contents stored in a device (e.g., a portable music playback device) that is connected to the information processing device 100 over a wire or radio.

Although the preferred embodiments of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

For example, although the aforementioned embodiments have been described based on the premise that the DMS stores contents, the DMS need not store contents and, in such a case, the DMS can be a server that manages only the attribute information on contents in another server.

In addition, although the description has been made based on the premise that the DMR displays contents, the DMR need not play back contents and, in such a case, the DMR can be have a function of re-redirecting another DMR to play back the contents.

What is claimed is:

1. An information processing device, comprising:
   a storage unit configured to store system-compliant content data and playback content attribute information, the playback content attribute information having been transmitted from a controller device requesting play back of the system-compliant content data, and the playback content attribute information including attribute information on the system-compliant content data requested to be played back and information for identifying a device that manages the system-compliant content data;
   a content data providing unit configured to, based on the attribute information on the system-compliant content data included in the playback content attribute information stored in the storage unit, acquire from the storage unit the system-compliant content data requested to be played back by the controller device;
   a system-compliant content data acquisition unit configured to acquire the system-compliant content data provided by the content data providing unit;
   a system-compliant content playback unit configured to play back the system-compliant content data acquired by the system-compliant content data acquisition unit;
   a system-noncompliant content playback unit configured to directly play back system-noncompliant content data;
   a content information converting unit configured to convert information of the system-noncompliant content data representative of meta-information to a format corresponding to that of the system-compliant content data, to acquire information on the system-noncompliant content data, and to apply the acquired information on the system-noncompliant content to the converted meta-information to obtain system-compliant formatted information for the system-noncompliant content data, in which the acquired information includes one or more of a title, a category or a playback time of the system-noncompliant content data; and
   a content playback information transmitting unit configured to, in response to a playback request from the controller device, transmit the system-compliant formatted information on the system-noncompliant content data to the controller device for controlling the system-noncompliant content playback unit to play back the system-noncompliant content data.

2. The information processing device according to claim 1, wherein the content playback information transmitting unit is configured to, each time new system-noncompliant content data is played back by the system-noncompliant content playback unit, transmit to the controller device information on the newly played-back system-noncompliant content data.

3. The information processing device according to claim 2, wherein the information on the system-noncompliant content data that is played back by the system-noncompliant content playback unit and is transmitted to the controller device by the content playback information transmitting unit is information on a content to be played back.

4. The information processing device according to claim 2, wherein the information on the system-noncompliant content data that is played back by the system-noncompliant content playback unit and is transmitted to the controller device by the content playback information transmitting unit is information on a playlist that includes a content to be played back.

5. The information processing device according to claim 1, wherein the system-noncompliant content playback unit is configured to decode the system-noncompliant content data to play back the system-noncompliant content data.

6. The information processing device according to claim 1, wherein the system-compliant format is the Digital Living Network Alliance (DLNA) format.

7. An information processing system, comprising:
   an information processing device configured to manage system-compliant content data and play back the system-compliant content data, and acquire system-noncompliant content data and play back the system-noncompliant data; and
   a controller device configured to control playback of the system-compliant content data and the system-noncompliant content data on the information processing device,
   wherein the information processing device includes:
   a storage unit configured to store playback content attribute information, the playback content attribute information having been transmitted from the controller device requesting play back of the system-compliant content data, and the playback content attribute information including attribute information on the system-compliant content data requested to be played back and information for identifying the device that manages the system-compliant content data,
   a content data providing unit configured to, on the basis of the attribute information on the system-compliant content data included in the playback content attribute information stored in the storage unit, acquire from the storage unit the system-compliant content data requested to be played back by the controller device,
   a system-compliant content data acquisition unit configured to acquire the system-compliant content data provided by the content data providing unit,
   a system-compliant content playback unit configured to play back the system-compliant content data acquired by the system-compliant content data acquisition unit,
   a system-noncompliant content playback unit configured to directly play back system-noncompliant content data, the system-noncompliant content data not complying with the system,
   a content information converting unit configured to convert information of the system-noncompliant content data representative of meta-information to a format corresponding to that of the system-compliant content data, to acquire information on the system-noncompliant content data, and to apply the acquired information on the system-noncompliant content to the converted meta-information to obtain system-compliant formatted information for the system-noncompliant content data, in which the acquired information includes one or more of a title, a category or a playback time of the system-noncompliant content data, and
   a content playback information transmitting unit configured to transmit the system-compliant formatted information on the system-noncompliant content data to the controller device for controlling the system-noncompliant content playback unit to play back the system-non-compliant content data, and wherein the controller device includes:

a server information acquisition unit configured to acquire server information from the information processing device that manages content data corresponding to contents and attribute information on the content data, the server information including server identification information for identifying the information processing device and a list of the content data;

a playback device information acquisition unit configured to acquire playback device information from the information processing device that acquires the content data and plays back the content data, the playback device information including playback device identification information for identifying the information processing device, a playback content determination unit configured to determine whether a content requested to be played back on the information processing device is a system-compliant content managed by the information processing device or a system-noncompliant content not managed by the information processing device, and a content playback control unit configured to identify the information processing device to play back content data selected from the list of the content data, transmit to the identified information processing device playback content attribute information including attribute information on the selected content data and the server identification information on the information processing device that manages the content data, and instruct the information processing device to acquire the selected content data and play back the content data.

8. An information processing method, comprising:

a storing step of storing system-compliant content data and playback content attribute information, the playback content attribute information having been transmitted from a controller device requesting play back of the system-compliant content data, and the playback content attribute information including attribute information on the system-compliant content data requested to be played back and information for identifying a device that manages the system-compliant content data;

a content data providing step of acquiring, on the basis of the attribute information on the system-compliant content data included in the playback content attribute information stored in the storing step, the system-compliant content data stored in the storing step and requested to be played back by the controller device;

a system-compliant content data acquiring step of acquiring the system-compliant content data provided in the content data providing step;

a system-compliant content playback step of playing back the system-compliant content data acquired in the system-compliant content data acquisition step;

a system-noncompliant content playback step of directly playing back system-noncompliant content data;

a content information converting step of converting information of the system-noncompliant content data representative of meta-information to a format corresponding to that of the system-compliant content data, acquiring information on the system-noncompliant content data, and applying the acquired information on the system-noncompliant content to the converted meta-information to obtain system-compliant formatted information for the system-noncompliant content data, in which the acquired information includes one or more of a title, a category or a playback time of the system-non-compliant content data; and a content playback information transmitting step of transmitting the system-compliant formatted information on the system-noncompliant content data to the controller device for controlling the system-noncompliant content data to be played back in the system-noncompliant content playback step.

9. An information processing method, comprising:

in a controller, a server information acquiring step of acquiring server information from an information processing device that manages content data corresponding to contents and attribute information on the content data, the server information including server identification information for identifying the information processing device and a list of the content data, a playback device information acquiring step of acquiring playback device information from the information processing device that acquires the content data from a content management server and plays back the content data, the playback device information including playback device identification information for identifying the information processing device, a playback content determination step of determining whether a content requested to be played back on the information processing device is a system-compliant content managed by the information processing device or a system-noncompliant content not managed by the information processing device, and a content playback control step of identifying the information processing device to play back content data selected from the list of the content data, transmitting to the identified information processing device playback content attribute information including attribute information on the selected content data and the server identification information on the information processing device that manages the content data, and instructing the information processing device to acquire the selected content data and play back the content data; and in the information processing device, a storing step of storing system-compliant content data and playback content attribute information, the playback content attribute information having been transmitted from a controller device requesting play back of the system-compliant content data, and the playback content attribute information including the attribute information on the system-compliant content data requested to be played back and information for identifying a device that manages the system-compliant content data, a content data providing step of acquiring, on the basis of the attribute information on the system-compliant content data included in the playback content attribute information stored in the storing step, the system-compliant content data stored in the storing step and requested to be played back by the controller device, a system-compliant content data acquiring step of acquiring the system-compliant content data provided in the content data providing step, a system-compliant content playback step of playing back the system-compliant content data acquired in the system-compliant content data acquisition step, a system-noncompliant content playback step of directly playing back system-noncompliant content data, a content information converting step of converting information of the system-noncompliant content data representative of meta-information to a format corresponding to that of the system-compliant content data, acquiring information on the system-noncompliant content data, and applying the acquired information on the system-noncompliant content to the converted meta-information to obtain system-compliant formatted information for the system-noncompliant content data, in which the acquired information includes one or more of a title, a category or a playback time of the system-non-compliant content data, and a content playback information transmitting step of transmitting the system-compliant formatted information on the system-noncompliant content data to the controller device for controlling the system-noncompliant content data to be played back in the system-noncompliant content playback step.

* * * * *